(12) United States Patent
Nashimoto et al.

(10) Patent No.: US 6,385,355 B1
(45) Date of Patent: May 7, 2002

(54) OPTICAL DEFLECTION ELEMENT

(75) Inventors: Keiichi Nashimoto; Shigetoshi Nakamura; Takashi Morikawa; Hiroaki Moriyama; Masao Watanabe; Eisuke Osakabe, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/517,628

(22) Filed: Mar. 3, 2000

(30) Foreign Application Priority Data

Mar. 15, 1999 (JP) ............................................. 11-068933

(51) Int. Cl.⁷ ............................................... G02B 1/295
(52) U.S. Cl. ................... 385/8; 385/4; 385/9; 385/129; 385/130; 385/131
(58) Field of Search ............................... 385/4, 5, 6, 7, 385/8, 9, 129, 130, 131, 132

(56) References Cited

U.S. PATENT DOCUMENTS

| 4,762,383 A | * | 8/1988 | Yamashita et al. | ........ 350/96.13 |
| 4,961,632 A | * | 10/1990 | Hatori et al. | ................ 350/358 |
| 5,802,223 A | * | 9/1998 | Nashimoto | ..................... 385/8 |
| 6,078,717 A | * | 6/2000 | Nashimoto et al. | ......... 385/130 |
| 6,282,357 B1 | * | 8/2001 | Kadota et al. | ............... 385/129 |

FOREIGN PATENT DOCUMENTS

| JP | A-58-130327 | 8/1983 |
| JP | A-62-238537 | 10/1987 |
| JP | A-1-248141 | 10/1989 |
| JP | A-2-311827 | 12/1990 |
| JP | A-9-5797 | 1/1997 |

OTHER PUBLICATIONS

A. Yariv, Rinehart & Winston, "Optical Electronics, 4$^{th}$ ed.", pp. 336–339, 1991.
Q. Ghen et al., Guided Wave Electro–Optic Beam Deflector Using Domain Reversal in LiTaO$_3$, Journal of Lightwave Technology, vol. 12, No. 8, pp. 1401–1403, Aug. 1994.

* cited by examiner

*Primary Examiner*—Rodney Bovernick
*Assistant Examiner*—Sung Pak
(74) *Attorney, Agent, or Firm*—Oliff & Berridge, PLC

(57) ABSTRACT

The present invention uses a single substrate to provide a small-size optical waveguide element that requires no optical axis adjustments, can be driven at a low voltage, is excellent in light utilization efficiency, and can rapidly two-dimensionally deflect a light beam. A right-triangle upper electrode and a rectangular transparent upper electrode are formed on top of a thin-film optical waveguide formed on a conductive substrate to serve as a lower electrode, and an emission right-angled prism is secured on top of the transparent upper electrode. A voltage is applied between the upper electrode and the conductive substrate, and between the transparent upper electrode and the conductive substrate. A horizontal deflection is performed upon application of a voltage to the upper electrode and a vertical deflection is performed upon application of a voltage to the transparent upper electrode.

10 Claims, 8 Drawing Sheets

OPTICAL DEFLECTION ELEMENT

BACKGROUND OF THE INVENTION

1. Field of the Invention

The present invention relates to an optical deflection element, and more particularly to an optical waveguide element capable of two-dimensionally deflecting a light beam incident to an optical waveguide by electro-optic effect. The optical deflection element is applicable to the entire spectrum of optoelectronics including laser printer, digital copier, facsimile, display, optical interconnection, optical crossconnect, bar-code reader, glyph code reader, optical disk pickup, optical scanner for surface inspection, optical scanner for surface shape presumption, and the like.

2. Description of the Prior Art

A typical laser beam optical deflector used in a laser beam printer, digital copier, facsimile, and the like has a rotating polygonal mirror called a polygon mirror for deflecting a beam from a gas laser and a semiconductor laser and an f$\theta$ lens for converging the laser beam reflected by the rotating polygonal mirror to the state of line motion of a uniform rate on an imaging surface such as a photoreceptor. Such an optical deflector employing a polygon mirror is large in size, and has problems in that it is lacking in durability and generates noise because the polygon mirror is mechanically, fast rotated by a motor, and a light scanning speed is limited by the number of rotations of the motor. A galvanomirror and a cantilever mirror are problematic in terms of deflection precision.

On the other hand, optical deflection elements taking advantage of acoustooptical effect are available as solid, electrical laser beam optical deflectors. Of them, optical waveguide elements smaller than bulk acoustooptical elements are especially expected. The optical waveguide elements are under study of application to a printer or the like as laser beam optical deflection elements to solve the drawbacks of laser beam optical deflectors employing a polygon mirror. The optical deflection elements of optical waveguide type have: an optical waveguide constructed from $LiNbO_3$ and $ZnO$; a unit for making a laser light beam incident to the optical waveguide; comb electrodes for pumping surface acoustic waves for deflecting the light beam within the optical waveguide by acoustooptical effect; and a unit for emitting the deflected light beam from the optical waveguide. Additionally, as required, thin-film lenses and the like are added to the elements. However, optical deflection elements taking advantage of acoustooptical effect generally have the following problems: the upper limit of laser deflection speed due to sonic limitation; reduced light utilization efficiency and processing of zero-order light because of diffraction efficiency as low as several tens of percent; and an expensive and large power supply unit for controlling frequencies of several hundred MHz. For this reason, it has been difficult to apply such optical deflection elements to laser printer, digital copier, facsimile, display, optical interconnection, bar-code reader, glyph code reader, optical disk pickup, and the like.

On the other hand, there are known prismatic optical deflection elements, as described in the literature A. Yariv, Optical Electronics, 4th ed. (New York, Rinehart and Winston, 1991) pp. 336 to 339, that employ oxide ferroelectric materials having electro-optic effect higher in modulation speed than acoustooptical effect. Although bulk elements employing ceramics or monocrystals are available as the prismatic optical deflection elements, they have been incapable of providing a practical deflection angle because of its large size and a substantially high driving voltage. Prismatic domain inversion optical deflection elements or prismatic electrode optical deflection elements are described in the literature Q. Chen, et al., J. Lightwave Tech. vol. 12 (1994) 1401. and Japanese Published Unexamined Patent Application No. Hei 1-248141. The prismatic domain inversion optical deflection elements or prismatic electrode optical deflection elements have prisms disposed in cascaded form by using a $LiNbO_3$ monocrystalline wafer on which a Ti diffused optical waveguide or proton exchanged optical waveguide is formed. An electrode separation of approximately 0.5 mm, which is equal to the thickness of a $LiNbO_3$ monocrystalline wafer, is required. Therefore, there exist problems in that a driving voltage is still high and a deflection angle as small as approximately 0.2 degrees obtained with a driving voltage of ±600 V, as described in the above-described literature, is far from a practical level. There is disclosed in Japanese Published Unexamined Patent Application No. Hei 2-311827 a method which changes the effective refractive index of an optical waveguide by acoustooptical effect and changes emission angles from a prism coupler. However, with the disclosed configuration, electrodes are not disposed so as to change the refractive index of an optical waveguide portion in which a prism coupler is disposed. Accordingly, there exists a problem in that emission angles cannot actually be changed, and even if emission angles could be changed, because of the construction that electrodes are disposed on the optical waveguide surface, the electrode interval would increase and a practical deflection angle could not be obtained as in the example of the above-described literature.

On the other hand, the inventor proposed (Japanese Published Unexamined Patent Application No. Hei 9-5797) a prismatic deflection element to solve the above-described driving voltage problem wherein the prismatic deflection element has an oxide optical waveguide having epitaxial or single orientation with electro-optic effect and a light source to make a light beam incident to the optical waveguide, and employs a thin-film optical waveguide provided with electrodes for deflecting the light beam within the optical waveguide by electro-optic effect. However, a distribution of electric field of a laser beam propagating through an optical waveguide s penetrates into a substrate. The absorption coefficient of a substrate having a practical resistivity is often large, penetrationg components are strongly absorbed by free carriers in a conductive substrate, and propagation loss in a thin-film optical waveguide reaches tens of dB/cm due to the absorption in addition to loss due to scattering of the optical waveguide itself, raising a problem that light utilization efficiency is practically insufficient.

Generally, in elements having a coplanar electrode placement, an $SiO_2$ clad layer is inserted between a metal electrode on an optical waveguide and the optical waveguide to prevent the penetration of electric fields into the metal electrode and avoid absorption of propagating light. However, there is a problem in that, if $SiO_2$ were provided between a conductive substrate and an oxide optical waveguide, an oxide optical waveguide having epitaxial or single orientation with electro-optic effect could not be fabricated because $SiO_2$ is amorphous. Moreover, there is a problem in that the relative dielectric constant of an oxide optical waveguide material having electro-optic effect ranges from several tens to several thousands, which is very large compared with the relative dielectric constant 3.9 of $SiO_2$, and since series capacitors are formed as an equivalent circuit in the described-above construction of a thin-film waveguide on a conductive substrate, an effective voltage applied to the thin-film optical waveguide is no more than several percent of an applied voltage, ultimately causing a significant increase in a driving voltage. In an i-GaAs waveguide of a compound semiconductor, an i-AlGaAs clad layer is inserted between the i-GaAs waveguide and n-AlGaAs lower clad layer to prevent the penetration of electric fields into the n-AlGaAs lower clad layer, thereby avoiding absorption by free carriers of the n-AlGaAs lower clad layer. However, a method for providing the same construction for an oxide optical waveguide has not been known wherein the oxide optical waveguide is made of a material entirely different from a compound semiconductor, is difficult of epitaxial growth, and has an electro-optic effect of relative dielectric constants ranging from several tens to several thousands. For this reason, the inventor has proposed a construction that an epitaxial or single orientation with buffer layer of a high relative dielectric constant is provided on a conductive substrate, on top of it is provided an oxide thin-film optical waveguide having epitaxial or single orientation with electro-optic effect, and further on top of it is provided an electrode, making it possible to satisfy both low driving voltage characteristics and low light propagation loss characteristics.

However, there is a problem in that both the above described optical deflection elements only perform one dimensional light deflection, and since two-dimensional deflection requires a combination of two deflection units, at least adjustments of an optical axis are required or apparatus construction is complicated. For example, to perform two-dimensional deflection by using the method disclosed in Japanese Published Unexamined Patent Application No. Hei 9-5797, combinations with a polygon mirror, a galvanomirror, a cantilever mirror, a bulk acoustooptical element, or a bulk electro-optic element are considered. However, in any event, the conventional problems will occur. Accordingly, two-dimensional deflection must be performed by one optical waveguide element.

As such a two-dimensional deflection element, in Japanese Published Unexamined Patent Application No. Sho 62-238537, an optical waveguide element capable of two-dimensional deflection is disclosed. The optical waveguide element has two units for providing acoustooptical effect by surface acoustic waves to change each of deflection angles within a substrate and emission angles in an emission part. However, the following problems remain still unsolved: the upper limit of laser deflection speeds due to the sonic limitation of acoustooptical deflection; reduced light utilization efficiency and the need to process plural-order light because of diffraction efficiency as small as several tens of percent; and an expensive and large-scale driving circuit for controlling frequencies of several hundreds of MHz. There is disclosed in Japanese Published Unexamined Patent Application No. Sho 58-130327 a two-dimensional deflection element that performs deflection within a substrate by acoustooptical effect of surface acoustic waves and changes emission angles by electro-optic effect by applying a voltage to an emission grating part. However, there still remain the problems of the upper limit of laser deflection speeds due to the sonic limitation of acoustooptical deflection and an expensive and large-scale power supply unit for controlling frequencies of several hundreds of MHz. Since an electrode for controlling the refractive index of the grating part is disposed on a optical waveguide surface, the interval between electrodes increases, with the result that application of 100 V causes an emission angle change of approximately 0.04 mrad (0.002 degrees), which is far from practical deflection angles as in the examples of the above-described literature and official gazettes. Also, since diffraction must be finally used also at the grating part, light utilization efficiency decreases or zero-order light and plural-order light must be processed. Furthermore, there arises a new problem that the use of acoustooptical effect and electro-optic effect requires that the respective driving circuits be used.

SUMMARY OF THE INVENTION

The present invention has been made to solve the above-described problems and, by using a single substrate, provides a small-size optical waveguide element that requires no optical axis adjustments, can be driven at a low voltage, is excellent in light utilization efficiency, and can rapidly two-dimensionally deflect a light beam.

The present invention has an optical waveguide having epitaxial or single orientation with electro-optic effect, provided on a conductive or semi-conductive single-crystal substrate to serve as a lower electrode, or a substrate on the surface of which a conductive or semi-conductive single-crystal thin film to serve as a lower electrode is formed, an electrode for controlling a light beam within the optical waveguide, disposed on the optical waveguide, the electrode forming an area, between the electrode and the single-crystal substrate or single-crystal thin film, that changes in refractive index in accordance with an applied voltage and deflects a light beam propagating through the optical waveguide in a first direction in accordance with the applied voltage, an emission prism for emitting the light beam within the optical waveguide in a second direction crossing the first direction, and a transparent electrode for controlling an emitted light beam, disposed between the emission prism and the optical waveguide, the transparent electrode forming an area, between the transparent electrode and the single-crystal substrate or single-crystal thin film, that changes in refractive index in accordance with an applied voltage and deflects a light beam emitted from the emission prism in the second direction in accordance with the applied voltage.

The term "single orientation" refers to the case where, in an X-ray diffraction pattern of a thin film, the strength of a specific crystal plane parallel to a substrate plane is 1% or less with respect to the strength of other crystal faces, and the term "epitaxial" refers to the case where a in-plane single orientation thin film also has single-orientation in a face direction of the substrate.

According to the present invention, since an area for deflecting a light beam propagating through an optical waveguide in a first direction in accordance with an applied voltage, and an area for deflecting a light beam emitted from an emission prism in a second direction crossing with the first direction are provided, two-dimensional deflection can be performed by controlling a voltage applied to the electrode for controlling a light beam within the optical waveguide and a transparent electrode for controlling an emitted light beam. Also, since a single single-crystal substrate or a substrate on which a single-crystal thin film is formed is used, there can be provided a small-size optical waveguide element that requires no optical axis adjustments, can be driven at a low voltage, is excellent in light utilization efficiency, and can rapidly two-dimensionally deflect a light beam.

The electrode for controlling a light beam within the optical waveguide of the present invention can be formed in a triangular shape and can have a prism area formed within the optical waveguide wherein the prism area has a different refractive area from surrounding areas upon application of a voltage.

A polarization domain inversion area of prism shape is provided in the optical waveguide, and an electrode for controlling a light beam within the optical waveguide can be formed in a triangular shape, and upon application of a voltage, can form within the optical waveguide the polarization domain inversion area of prism shape having a different refractive index from surrounding areas.

The substrate on which the single-crystal thin film is formed can be formed as a substrate which has a smaller refractive index than the optical waveguide and on the surface of which an epitaxial or single orientation conductive or semi-conductive oxide is provided as a thin film.

The optical waveguide may be provided on the single-crystal substrate or single-crystal thin film through a buffer layer having a smaller refractive index than the optical waveguide.

The conductive or semi-conductive single-crystal substrate can be constructed from a transparent oxide having a smaller refractive index than the optical waveguide.

On the surface of the optical waveguide may be provided a clad layer having a smaller refractive index than the optical waveguide, wherein the optical waveguide can be constructed from an oxide ferroelectric.

In the present invention, the following materials can be used as a conductive or semi-conductive single-crystal substrate to serve as a lower electrode substrate, or a conductive or semi-conductive single-crystal thin film, particularly an epitaxial or single orientation thin film to serve as a lower electrode: $SrTiO_3$ doped with Nb or the like, Al-doped ZnO, $In_2O_3$, $RuO_2$, $BaPbO_3$, $SrRuO_3$, $YBa_2Cu_3O^{7-x}$, $SrVO_3$, $LaNiO_3$, $La_{0.5}Sr_{0.5}CoO_3$, $ZnGa_2O_4$, $CdGa_2O_4$, $CdGa_2O_4$, $Mg_2TiO_4$, $MgTi_2O_4$, and other oxides, Si, Ge, diamond, and other single semiconductors, AlAs, AlSb, AlP, GaAs, GaSb, InP, InAs, InSb, AlGaP, AlLnP, AlGaAs, AlInAs, AlAsSb, GaInAs, GaInSb, GaAsSb, InAsSb, and other III-V-family compound semiconductors, ZnS, ZnSe, ZnTe, CaSe, Cdte, HgSe, HgTe, CdS, and other II-VI-family compound semiconductors, Pd, Pt, Al, Au, Ag, and other metals. The use of oxides is often advantageous to the membrane quality of an oxide thin-film optical waveguide disposed in an upper portion. It is desirable that the conductive or semi-conductive single-crystal substrates, or conductive or semi-conductive epitaxial or single orientation thin films are selected in accordance with carrier mobility required by the crystal structure, deflection speed, switching speed, or modulation speed of the ferroelectric thin film. Although it is effective in terms of RC time constant that the resistivity of the thin films is $10^8$ Ω·cm or less, preferably $10^6$ Ω·cm or less, the thin films can be used as a lower electrode if the resistivity is such that voltage drop is negligible. When a silicon substrate is used that, as the refractive index of the thin films, has a large refractive index of, e.g., 3.45, which is higher than the resistivity of normal optical waveguide materials, since the film thickness of the buffer layer must be made considerably thick to prevent the leak of light to the substrate, it is desirable that the thin films have a lower refractive index than the optical waveguide materials to reduce the thickness of the buffer layer and achieve low-voltage driving.

The following materials can be used as a substrate on the surface of which a conductive or semi-conductive epitaxial or single orientation thin film to serve as a lower electrode is formed: $SrTiO_3$, $BaTiO_3$, $BaZrO_3$, $LaAlO_3$, $ZrO_2$, $Y_2O_3$8%-$ZrO_2$, MgO, $MgAl_2O_4$, $LiNbO_3$, $LiTaO_3$, $Al_2O_3$, ZnO, and other oxides, Si, Ge, diamond, and other single semiconductors, AlAs, AlSb, AlP, GaAs, GaSb, InP, InAs, InSb, AlGaP, AlLnP, AlGaAs, AlInAs, AlAsSb, GaInAs, GaInSb, GaAsSb, InAsSb, and other III-V-family compound semiconductors, ZnS, ZnSe, ZnTe, CaSe, Cdte, HgSe, HgTe, CdS, and other II-VI-family compound semiconductors. The use of oxides is often advantageous to the membrane quality of an oxide thin-film optical waveguide disposed in an upper portion.

When a buffer layer is used, materials satisfying the following conditions are selected as the material of the buffer layer: the buffer layer has a smaller refractive index than thin-film optical waveguide materials; the ratio of the relative dielectric constant of the buffer layer and that of the optical waveguide is 0.002 or more, preferably the ratio of the relative dielectric constant of the buffer layer and that of the optical waveguide is 0.006 or more; and the relative dielectric constant of the buffer layer is 8 or more. Buffer layer materials must be able to hold an epitaxial relationship with conductive substrate materials and optical waveguide materials. As a condition that the epitaxial relationship can be held, it is desirable that buffer layer materials are similar to conductive substrate materials and optical waveguide materials in crystal structure, and the difference of granting constants is 10% or less. However, this condition need not always be observed if the epitaxial relationship can be held. Specifically, the following materials can be used: tetragonal, orthorhombic, or pseudo-cubic $ABO_3$ perovskite oxides such as $SrTiO_3$, $BaTiO_3$, $(Sr_{1-x}Ba_x)TiO_3$ (0<x<100), $PbTiO_3$, $Pb_{1-x}La_x(Zr_yTi_{1-y})_{1-x/4}O_3$ (0<x<30, 0<y<100, PZT, PLT, PLZT depending on the values of x and y), $Pb(Mg_{1/3}Nb_{2/3})O_3$, $KNbO_3$; hexagonal $ABO_3$ perovskite oxides such as ferroelectrics typified by $LiNbO_3$ and $LiTaO_3$; tungsten bronze oxides such as $Sr_xBa_{1-x}Nb_2O_6$ and $Pb_xBa_{1-x}Nb_2O_6$; and $Bi_4Ti_3O_{12}$, $Pb_2KNb_5O_{15}$, $K_3Li_2Nb_5O_{15}$, ZnO, and other substitutive dielectrics. It is effective that the ratio of the film thickness of the clad layer and that of the optical waveguide is 0.1 or more, preferably 0.5 or more, and the film thickness of the clad layer is 10 nm or more.

The optical waveguide is formed in thin film form and thin-film optical waveguide materials are selected from oxides. Specifically, the following materials can be used: tetragonal, orthorhombic, or pseudo-cubic $ABO_3$ perovskite oxides such as $BaTiO_3$, $PbTiO_3$, $Pb_{1-x}La_x(Zr_yTi_{1-y})_{1-x/4}O_3$ (PZT, PLT, PLZT depending on the values of x and y), $Pb(Mg_{1/3}Nb_{2/3})O_3$, $KNbO_3$; hexagonal $ABO_3$ perovskite oxides such as ferroelectrics typified by $LiNbO_3$ and $LiTaO_3$; tungsten bronze oxides such as $Sr_xBa_{1-x}Nb_2O_6$ and $Pb_xBa_{1-x}Nb_2O_6$; and $Bi_4Ti_3O_{12}$, $Pb_2KNb_5O_{15}$, $K_3Li_2Nb_5O_{15}$, and other substitutive dielectrics. The film thickness of the thin-film optical waveguide is usually set from 0.1 μm to 10 μm though it may be properly set depending on purposes.

When a clad layer is used, it can be made of the same material as that of a buffer layer. Specifically, materials satisfying the following conditions are selected as the material of the clad layer: the clad layer has a smaller refractive index than thin-film optical waveguide materials; the ratio of the relative dielectric constant of the clad layer and that of the optical waveguide is 0.002 or more, preferably the ratio of the relative dielectric constant of the clad layer and that of the optical waveguide is 0.006 or more; and the relative dielectric constant of the clad layer is 8 or more. Clad layer materials need not necessarily hold an epitaxial relationship with optical waveguide materials; polycrystalline thin films may be used. However, to obtain a uniform interface, the clad layer materials must be able to hold an epitaxial relationship with optical waveguide materials. As a condition that the epitaxial relationship can be held, it is desirable that clad layer materials are similar to thin-film optical waveguide materials in crystal structure, and the difference of granting constants is 10% or less. However, this condition need not always be observed if the epitaxial relationship can be held. Specifically, the following materials can be used: tetragonal, orthorhombic, or pseudo-cubic $ABO_3$ perovskite oxides such as $SrTiO_3$, $BaTiO_3$, $(Sr_{1-x}Ba_x)TiO_3$ (0<x<100), $PbTiO_3$, $Pb_{1-x}La_x(Zr_yTi_{1-y})_{1-x/4}O_3$ (0<x<30, 0<y<100, PZT, PLT, PLZT depending on the values of x and y), $Pb(Mg_{1/3}Nb_{2/3})O_3$, $KNbO_3$; hexagonal $ABO_3$ perovskite oxides such as ferroelectrics typified by $LiNbO_3$ and $LiTaO_3$; tungsten bronze oxides such as $Sr_xBa_{1-x}Nb_2O_6$ and $Pb_xBa_{1-x}Nb_2O_6$; and $Bi_4Ti_3O_{12}$, $Pb_2KNb_5O_{15}$, $K_3Li_2Nb_5O_{15}$, ZnO, and other substitutive dielectrics. It is effective that the ratio of the film thickness of the clad layer and that of the optical waveguide is 0.1 or more, preferably 0.5 or more, and the film thickness of the clad layer is 10 nm or more.

As the electrode for controlling a light beam within the optical waveguide, it is possible to use metals or alloys such as Al, Ti, Cr, Ni, Cu, Pd, Ag, In, Sn, Ta, W, Ir, Pt, and Au, and transparent oxide electrodes having a smaller refractive index than the optical waveguide, such as ITO and Al-doped ZnO. When a clad layer having a smaller refractive index than the optical waveguide is provided between the optical waveguide and an upper electrode, although the upper electrode may be made of any material, it is desirable to use a transparent oxide electrode such as ITO and Al-doped ZnO to prevent an increase in a driving voltage. The electrode for controlling a light beam within the optical waveguide can be formed in a triangular shape and can form a prism area that differs from the surrounding area in refractive index upon application of a voltage. When the optical waveguide has a polarization domain inversion area of prism shape, by applying a voltage to the electrode for controlling a light beam within the optical waveguide, refractive indexes can be made different between the polarization domain inversion area of prism shape and other areas.

As the material of the emission prism, materials having a higher refractive index than the optical waveguide can be used in accordance with on optical waveguide materials and light wavelength. In many cases, rutile ($TiO_2$), GaP, GaAs, or refractive index glass can be used. The base angle of the prism or the angle of an oblique face with respect to the base can be set properly depending on the refractive index of the optical waveguide, a refractive index change of the optical waveguide by electro-optic effect, and the refractive index of the prism.

The transparent upper electrode for controlling an emitted light beam can be made of metals or alloys such as Al, Ti, Cr, Ni, Cu, Pd, Ag, In, Sn, Ta, W, Ir, Pt, and Au that have a smaller refractive index than the optical waveguide. An electrode made thinner, without changing transparency, can be used as the transparent electrode. Also, as the material of the transparent electrode, oxides such as ITO and Al-doped ZnO that have a smaller refractive index than the optical waveguide can be used. However, it is desirable to use transparent oxide electrodes such as ITO and Al-doped ZnO. The transparent electrode for controlling an emitted light beam is disposed between the emission prism and the optical waveguide, and can, by applying a voltage between the transparent electrode for an emitted light beam and the lower electrode, generate different refractive indexes between an area surrounded by the emission prism and the single-crystal substrate or single-crystal thin film and other areas.

A thin-film lens can be provided in the thin-film optical waveguide for the purpose of control of an incident light beam or other purposes. With the effective refractive index of a lens part being larger than that of the thin-film optical waveguide, a circular or pupillary convex lens of the mode index system, a Fresnel lens, or a lens of the grating system can be provided. For example, after fabricating a lenticular ferroelectric thin film that has a larger refractive index than a thin-film optical waveguide, a thin-film lens can be formed by fabricating the thin-film optical waveguide on top of the ferroelectric thin film.

The clad layer, thin-film optical waveguide, buffer layer, and lens layer are fabricated by the solid phase epitaxy of a thin film fabricated by wet processes such as the vapor growth method, sol-gel method, or MOD method, or dry process selected from electron beam evaporation, flash evaporation, ion plating, Rf-magnetron sputtering, ion beam sputtering, laser abrasion, MBE, CVD, plasma CVD, MOCVD, and the like. The most effective method is to subject the buffer layer, thin-film optical waveguide, and clad layer to solid phase epitaxial growth by applying, to a substrate, solution of a metaloorganic compound such as metal alkoxide and organic metal salt by wet processes such as the sol-gel method or the MOD method and further baking the substrate. The solid phase epitaxial growth method is low in facility costs and excellent in uniformity within a substrate compared with various vapor growth methods. In addition, the solid phase epitaxial growth method enables easy and reproducible control of refractive indexes important to the structure control of the buffer layer, thin-film optical waveguide, and clad layer simply by mixing the composition of metaloorganic compound precursors in accordance with a thin-film composition having a refractive index necessary for the buffer layer, thin-film optical waveguide, and clad layer, and also allows the growth of the buffer layer, thin-film optical waveguide, and clad layer having low light propagation loss.

BRIEF DESCRIPTION OF THE DRAWINGS

Preferred embodiments of the present invention will be described in detail based on the followings, wherein.

DESCRIPTION OF THE PREFERRED EMBODIMENTS

Figure 1:
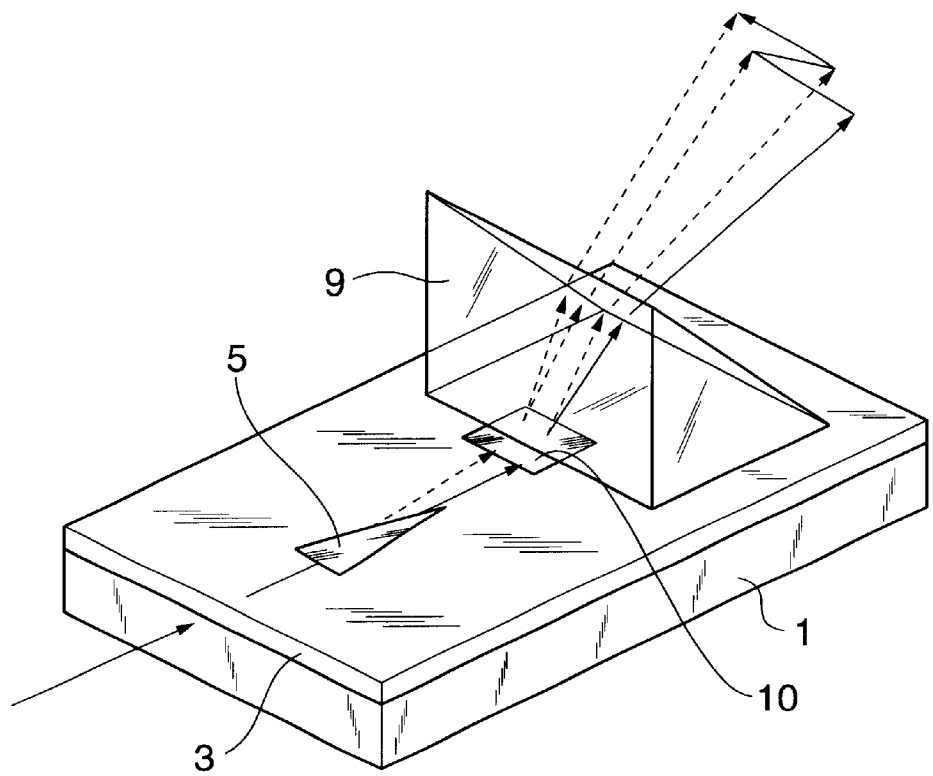
FIG. 1 is a perspective view of an optical deflection element of a first embodiment of the present invention.
Figure 4:
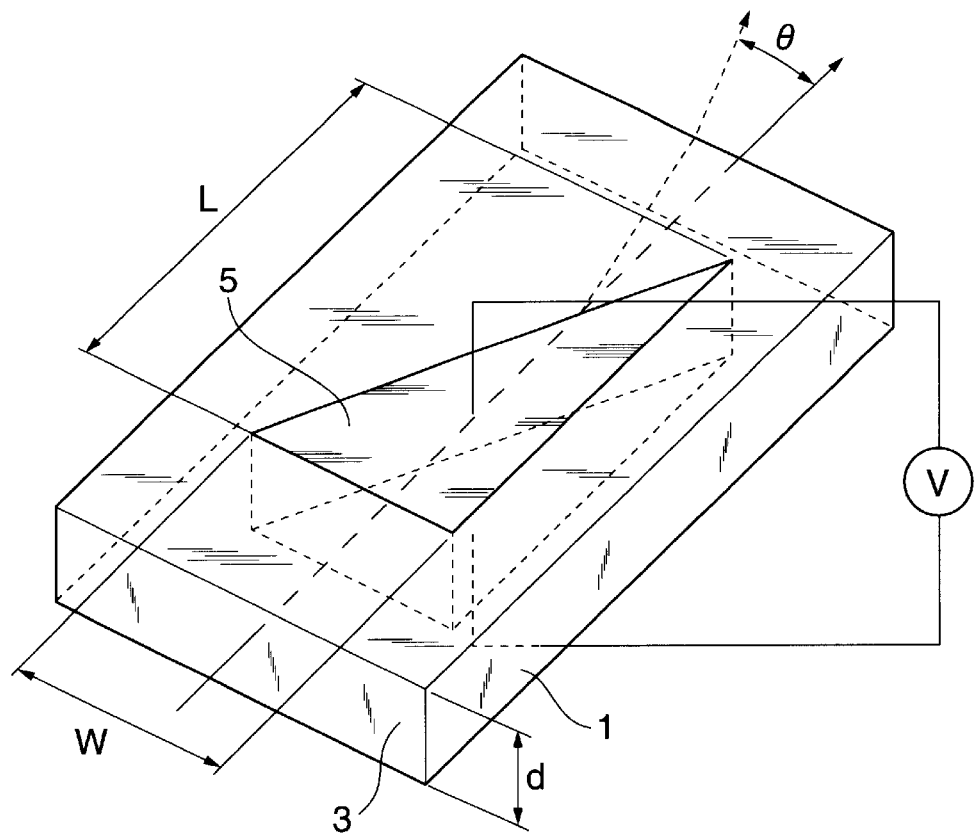
FIG. 4 is a perspective view showing a deflection direction in a prism area of the optical waveguide.
Figure 5:
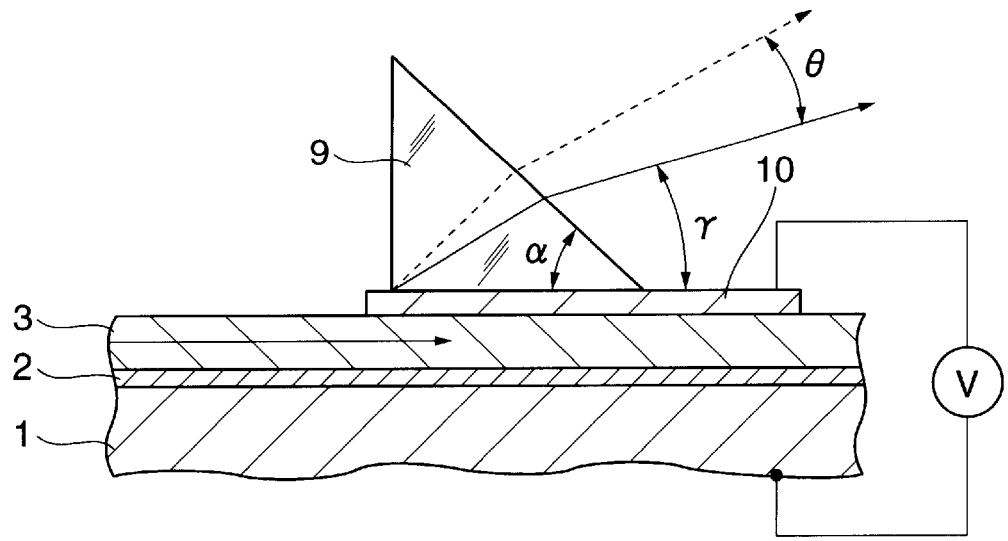
FIG. 5 is a cross-sectional view showing a deflection direction by an electrode provided between an emission prism and the optical waveguide.

Hereinafter, embodiments of the present invention will be described in detail with reference to the accompanying drawings. As shown in FIG. 1, an optical deflection element has a thin-film optical waveguide 3 formed on a conductive substrate 1 as a lower electrode. A right-triangle upper electrode 5, which is used as an electrode for controlling a light beam within the optical waveguide, is formed on the upper face of the thin-film optical waveguide 3 at a light incidence side wherein the upper electrode 5 is located so that the base is orthogonal to a light propagation direction and is at the light incidence side. A rectangular transparent upper electrode 10, which is used as a transparent electrode for controlling an emitted light beam, is formed at the downstream side of the light propagation direction. An emission right-angled prism 9 is secured on the upper face of the transparent upper electrode 10 so that a part of the transparent upper electrode 10 at the incidence side is exposed, wherein the emission right-angled prism 9 has a bottom having a larger area than the transparent upper electrode 10, and has a base angle α and a refractive index $n_p$. As shown in FIGS. 4 and 5, a voltage is applied between the upper electrode 5 and the conductive substrate 1, and between the transparent upper electrode 10 and the conductive substrate 1. The shape of the upper electrode, without being limited to a right triangle, may be the shapes of other triangles, or a shape that, toward the light propagation direction, gradually narrows, gradually widens, or gradually widens and then narrows.

Figure 2A:
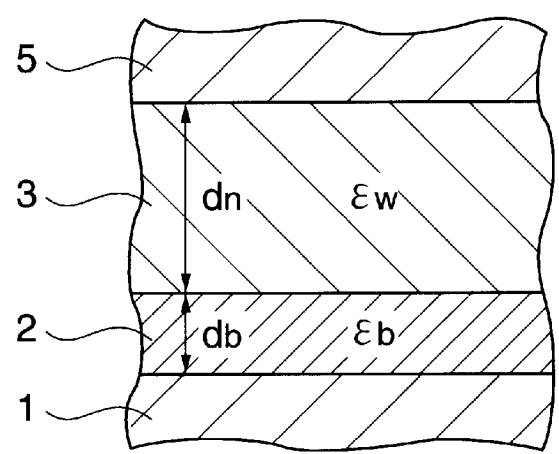
FIG. 2A is a cross-sectional view of an optical waveguide provided with a buffer layer.

The conductive substrate 1 can be formed by a transparent conductive substrate. However, if it is not a transparent conductive substrate, when light is introduced to an optical waveguide provided on the conductive substrate, a part of full light intensity penetrates into the conductive substrate, and if the transparency of the substrate is low, components penetrating into the substrate are absorbed, resulting in propagation loss as light propagates. Accordingly, when a transparent conductive substrate cannot be used, as shown in FIG. 2A, if an conductive substrate 1 area into which light penetrates is replaced by a buffer layer 2 free from light absorption, light absorption by the conductive substrate 1 is eliminated and propagation loss can be reduced.

For the buffer layer 2 to function as an isolation layer between the thin-film optical waveguide 3 and the conductive substrate 1, the refractive index of a buffer layer material must be smaller than that of a thin-film optical waveguide material. Also, to reduce light propagation loss due to scatteriing by grain boundary or the like on the surface of the thin-film optical waveguide and therein to a practical level, the buffer layer material must be able to hold an epitaxial relationship with a conductive substrate material and an optical waveguide material. It is desirable that the thin-film optical waveguide material has a high electro-optic coefficient and the conductive substrate material has a low resistivity. A film thickness ratio between the buffer layer 2 and the thin-film optical waveguide 3 must be at least 0.1 to reduce propagation loss to 1 dB/cm or less. For operation in a single mode of $TE_0$, an adequate film thickness ratio between the buffer layer 2 and the thin-film optical waveguide 3 is 0.5 or more.

Figure 3:
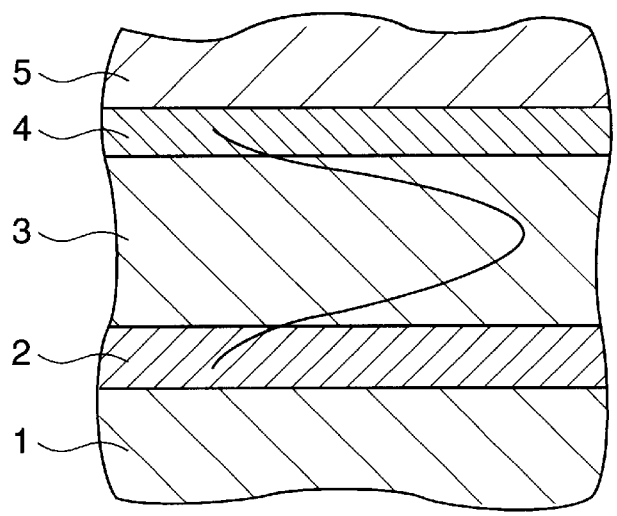
FIG. 3 is across-sectional view of the optical waveguide, provided with a buffer layer and a clad layer, in which an electromagnetic field distribution is shown.

Next, although the upper electrode can be constructed from a metal, when a metal electrode is provided on the thin-film optical waveguide 3, if the frequency of light in the thin-film optical waveguide exceeds the plasma frequency of the metal electrode, components penetrating into the metal electrode as light propagates are strongly absorbed by carriers in the metal, causing propagation loss. However, as shown in FIG. 3, if an area where the penetration occurs is replaced by a less absorbent clad layer 4, absorption by the upper metal electrode is eliminated, contributing to reduction of propagation loss. For the clad layer to thus function as an isolation layer between the thin-film optical waveguide and the metal electrode, generally the refractive index of a clad layer material must be smaller than that of a thin-film optical waveguide material. If a transparent conductive thin film could be used as the upper electrode, propagation loss would not occur even if the clad layer is not used.

Figure 2B:
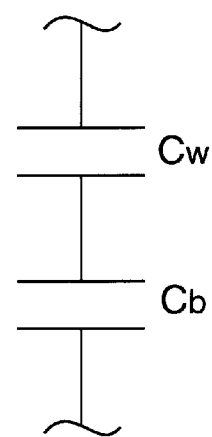
FIG. 2B is a view of an equivalent circuit of an optical waveguide, a buffer layer, and a substrate of FIG. 2A.

On the other hand, if the above-described buffer layer 2 exists between the conductive substrate 1 and the thin-film optical waveguide 3, a voltage applied between the electrodes is distributed by a series circuit that connects in series the respective capacitances of the thin-film optical waveguide and the buffer layer, as shown by a equivalent circuit of FIG. 2B, an effective voltage applicable to the thin-film optical waveguide decreases. However, by constructing a buffer 3 from a high dielectric material having a predetermined film thickness, a high effective voltage can be applied to the thin-film optical waveguide.

Specifically, when the capacitance of the thin-film optical waveguide 3 is $C_w$, the capacitance of the buffer layer 2 is $C_b$, a full applied voltage is $V_0$, the relative dielectric constant and film thickness of the thin-film optical waveguide are respectively $\epsilon_w$ and $d_w$, the relative dielectric constant and film thickness of the buffer layer are respectively $\epsilon_b$ and $d_b$, the dielectric constant of vacuum is $\epsilon_0$ ($8.854\times10^{-14}$ (F/cm)), and an electrode area is S, an effective voltage $V_w$ applied to the thin-film optical waveguide is represented by the following expression.

$$V_w = C_b/(C_w+C_b)\times V_0 = \epsilon_b d_w / (\epsilon_w d_b + \epsilon_b d_w)\times V_0 \quad (1)$$

In this embodiment, since $d_b/d_w$ is about 0.1 or more, a value of about 0.02 or more as $V_w/V_0$, that is, a value of about 0.002 or more as $\epsilon_b/\epsilon_w$, which indicates that an effective voltage is 2% or more of an applied voltage, preferably a value of about 0.1 or more as $V_w/V_0$, that is, a value of about 0.006 or more as $\epsilon_b/\epsilon_w$, which indicates that an effective voltage is about 10% or more of an applied voltage can be obtained. The upper limit of $\epsilon_b/\epsilon_w$, which depends on a combination of materials usable in the buffer layer and the thin-film optical waveguide, is about 10. The relative dielectric constant of the buffer layer should preferably 8 or more so that a value of about 0.002 or more as $\epsilon_b/\epsilon_w$ can be obtained because there are materials close to about 4000 as the relative dielectric constant of the optical waveguide. This is because, in the condition that an effective voltage is about 2% or less of an applied voltage, the purpose of greatly reducing a driving voltage by providing an epitaxial optical waveguide having electro-optic effect on the conductive substrate becomes meaningless. The above-described principle is also exactly true of the clad layer.

As has been described above, an oxide thin-film optical waveguide having epitaxial or single orientation with electro-optic effect is provided on a transparent conductive or semi-conductive single-crystal substrate to serve as a lower electrode, and on top of it is provided a transparent upper electrode, or an epitaxial or single orientation buffer layer having a high dielectric constant is provided on a conductive or semi-conductive single-crystal substrate to serve as a lower electrode; on top of it is provided an oxide thin-film optical waveguide having a larger refractive index than the buffer layer and having epitaxial or single orientation with electro-optic effect; if required, on top of it is provided a clad layer of a high dielectric constant that has a smaller refractive index than the optical waveguide; and further on top of it is provided an upper electrode, thereby enabling a construction of sandwiching the optical waveguide between upper and lower electrodes with oxide ferroelectric materials and providing a low driving voltage without impairing the low light propagation loss characteristics. The single-crystal substrate may be replaced by a substrate on the surface of which an epitaxial or single orientation conductive or semi-conductive oxide is provided as a thin film.

As shown in FIG. 4, when a voltage is applied in a Z-axis direction between the upper electrode 5 and the conductive substrate 1 of a lower electrode, which is at the distance of d from the upper electrode 5, via the buffer layer 2, the thin-film optical waveguide 3, and the clad layer 4 if required, if the thin-film optical waveguide 3 has Pockels effect, which is first-order electro-optic effect, a refractive index change in accordance with the following expression occurs between the area surrounded by the upper electrode 5 and the substrate 1 and other areas.

$$\Delta n = \tfrac{1}{2} \cdot r \cdot n^3 \cdot (V/d) \quad (2)$$

When the thin-film optical waveguide 3 has Kerr effect, which is second-order electro-optic effect, a refractive index change in accordance with the following expression occurs.

$$\Delta n = \tfrac{1}{2} \cdot R \cdot n^3 \cdot (V/d)^2 \quad (3)$$

where r and R in the expressions (2) and (3) are electro-optic coefficients.

Accordingly, by applying a voltage between the upper electrode and the lower electrode, as shown in FIG. 4, a prism area of a right-angled prism shape, which is different in refractive index from the surrounding area, is formed in a portion sandwiched between the upper electrode and the lower electrode. If the base length and height of the upper electrode 5 of right-triangle shape are W and L, respectively, after passing through the prism area formed between the electrodes, light deflects in a plane parallel to the substrate surface by a deflection angle $\theta$ shown by the following expression. The deflection angle $\theta$ is referenced to a direction in which a laser beam travels straight.

$$\theta = \Delta n \times L / W \quad (4)$$

In this way, when a right-triangle electrode is provided as an upper electrode and a voltage is applied, a prism area is formed, a laser beam is deflected by the prism area, no un-deflected components (zero-order light) exist in the deflection state, and there is little scattered light. Accordingly, the problem of insertion loss and cross talk can be solved.

When the thin-film optical waveguide 3 has a polarization domain inversion area of prism shape, by applying a voltage to the upper electrode 5 for controlling a light beam within the optical waveguide, different refractive indexes can be generated between the polarization domain inversion area of prism shape and other areas, and similarly a laser beam is deflected.

On the other hand, if an emission prism having a base angle $\alpha$ and a refractive index $n_p$ is provided on the surface of the thin-film optical waveguide 3 having an effective refractive index N, a laser beam is emitted at an angle $\gamma_0$ in accordance with the following expression.

$$\gamma_0 = \cos^{-1}[n_p \times \sin[\sin^{-1}(N/n_p) - \alpha]] - \alpha \quad (5)$$

In this embodiment, as shown in FIG. 5, since the transparent electrode 10 for controlling an emitted light beam is provided between the emission prism 9 and the thin-film optical waveguide 3, a light beam can be emitted from the emission prism 9 via the electrode between the emission prism 9 and the thin-film optical waveguide 3. By applying a voltage between the transparent electrode for controlling an emitted light beam and the substrate 1 of a lower electrode, the effective refractive index of the thin-film optical waveguide 3 can be changed by changing refractive indexes according to the above (3) expression in the area surrounded by the emission prism 9 and the conductive substrate 1. By the change of refractive indexes, emission angles change within a face orthogonal to the substrate surface according to the following expression.

$$\gamma_1 = \cos^{-1}[n_p \times \sin[\sin^{-1}(N + \Delta n / n_p) - \alpha]] - \alpha \quad (6)$$

As has been described, according to this embodiment, two-dimensional deflection can be made according to the following expression (7) represented by a combination of a horizontal deflection direction by refractive index change of a prism area sandwiched between the right-triangle upper electrode and the lower electrode and a vertical deflection direction by refractive index change of an area sandwiched between the emission prism and the conductive substrate 1.

$$\theta = \gamma_0 - \gamma_1 \quad (7)$$

Next, a description will be made of examples of fabricating the optical deflection element of the above described first embodiment.

EXAMPLE 1

In an example 1, a two-dimensional deflection element as shown in FIG. 1 was fabricated by growing an epitaxial PZT(95/5) buffer layer having a film thickness of about 400 nm on an opaque but low-resistance Nb-doped $SrTiO_3$(100) single-crystal lower electrode substrate, next growing an epitaxial PLZT(9/65/35) thin-film optical waveguide having a film thickness of about 1000 nm, further forming a triangular ITO electrode for controlling a light beam within the optical waveguide and an ITO electrode for controlling an emitted light beam, and providing an incidence end face and an emission prism.

The buffer layer and the optical waveguide were fabricated as follows by solid phase epitaxial growth. First, acetic anhydride salt $Pb(CH_3COO)_2$, zirconium isopropoxide $Zr(O\text{-i-}C_3H_7)_4$, and titanium isopropoxide $Ti(O\text{-i-}C_3H_7)_4$, as starting materials, were dissolved in 2-methoxy-ethanol, distilled for about six hours and then refluxed for about 18 hours, and finally PZT (95/5) precursor solution having Pb concentration of approximately 0.6 M was obtained.

Furthermore, the precursor solution was spin-coated on an Nb-doped $SrTiO_3$ substrate 10 mm square. All these operations were performed in an $N_2$ atmosphere. Next, the solution was heat at about 10° C./sec in an $O_2$ atmosphere and preserved at about 350° C., then heated at about 100° C./sec and preserved at about 750° C., and finally the electric furnace was powered off and the solution was cooled. Thereby, a PZT thin film of a first layer having a film thickness of about 100 nm was formed by solid phase epitaxial growth. By repeating this process three more times, an epitaxial PZT buffer layer having a total film thickness of about 400 nm was obtained. After the buffer layer was grown, a PZT(9/65/35) optical waveguide layer was fabricated in the same way by solid phase epitaxial growth. First, acetic anhydride salt $Pb(CH_3COO)_2$, lanthanum isopropoxide $La(O-i-C_3H_7)_3$, zirconium isopropoxide $Zr(O-i-C_3H_7)_4$, and titanium isopropoxide $Ti(O-i-C_3H_7)_4$, as starting materials, were dissolved in 2-methoxy-ethanol, distilled for about six hours and then refluxed for about 18 hours, and finally PLZT (9/65/35) precursor solution having Pb concentration of approximately about 0.6 M was obtained. Furthermore, the precursor solution was spin-coated on an Nb-doped $SrTiO_3$ substrate having the buffer layer. All these operations were performed in an $N_2$ atmosphere. Next, the solution was heated at about 10° C./sec in an $O_2$ atmosphere and preserved at about 350° C., then heated at about 100° C./sec and preserved at about 750° C., and finally the electric furnace was powered off and the solution was cooled. Thereby, a PLZT thin film of a first layer having a film thickness of about 100 nm was formed by solid phase epitaxial growth. By repeating this process nine more times, an epitaxial PLZT thin-film optical waveguide having a total film thickness of about 1000 nm was obtained. Crystallographically, a structure of single orientation PLZT (100)//PZT(100)//Nb-$SrTiO_3$(100) with in-plane orientation PLZT[001]//PZT[001]//and Nb-$SrTiO_3$[001] was obtained. A triangular electrode 5 for controlling a light beam within the optical waveguide and an electrode 10 for controlling an emitted light beam were formed on the PLZT thin-film optical waveguide by the lift off method wherein the electrode 5 was constructed from an ITO thin film having a film thickness of about 200 nm, produced by sputtering, and had a base of 100 μm and a height of 1000 μm, and the electrode 10 had an area 1000 μm square. Furthermore, a light beam incidence part was formed by polishing the end face, a rutile prism 9 having a base angle of 60 degrees and a base of 5 mm was secured on top of the electrode 10 for controlling an emitted light beam, and thus the two-dimensional deflection element was fabricated.

First, to evaluate the optical waveguide characteristics, a laser beam of 633 nm wavelength was introduced to the PLZT thin-film optical waveguide of this example by prism coupling and an intensity distribution of scattered light of $TE_0$ mode in a light propagation direction was measured by an optical fiber. From the gradient of the relationship between the logarithm of scattered light intensity and light propagation distances, light propagation loss was determined to be approximately 3.6 dB/cm, which indicates a practical level. The refractive index n of the PLZT thin-film optical waveguide was approximately 2.51. On the other hand, only the PZT buffer layer of this example was directly formed on the Nb-doped $SrTiO_3$ substrate and the relative dielectric constant of the buffer layer having a film thickness of about 400 nm was measured as approximately 400. the relative dielectric constant of the PLZT thin-film optical waveguide grown on the Nb-doped $SrTiO_3$ substrate was measured as approximately 900. Accordingly, the effective voltage of the PLZT thin-film optical waveguide, calculated from the above expression (1), was approximately 53%.

Figure 6:
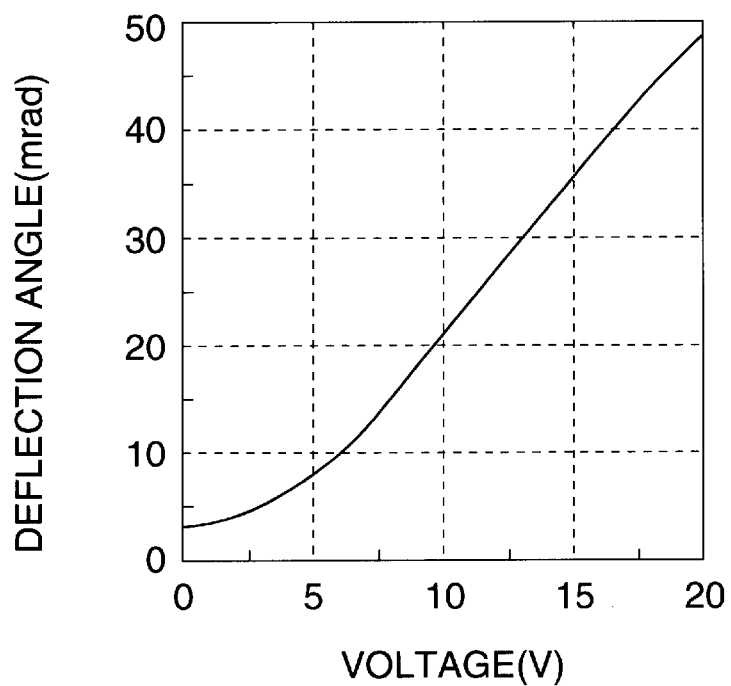
FIG. 6 is a graph showing the characteristics of deflection of light beams by a triangular electrode of a two-dimensional deflection element of an example 1.
Figure 7:
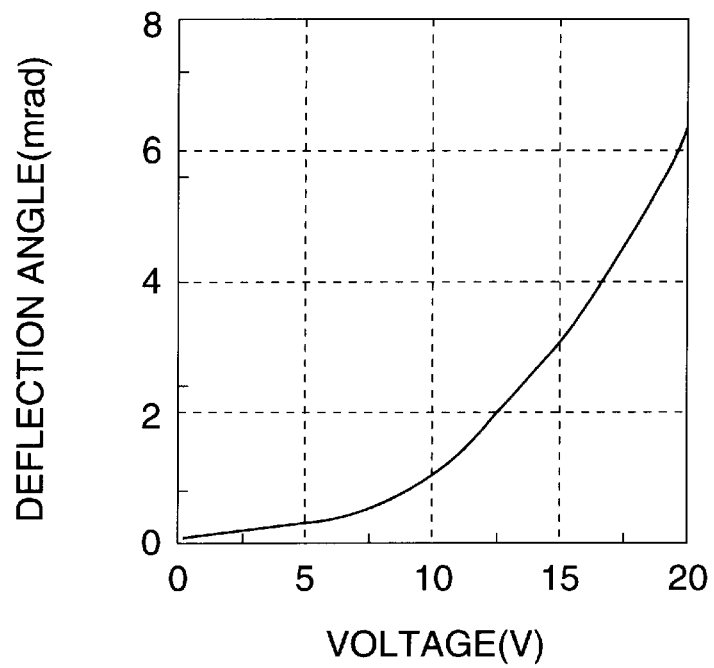
FIG. 7 is a graph showing the characteristics of deflection by an electrode provided between the emission prism and the optical waveguide of the two-dimensional deflection element of the example 1.

A laser beam having a wavelength of 633 nm, collimated 100 μm wide through the incidence end face, was introduced to the PLZT thin-film optical waveguide 3 of the two-dimensional deflection element of this example. The incident light beam was deflected because a voltage applied between the triangular electrode 5 for controlling a light beam within the optical waveguide and the electrode formed by the lower Nb-doped $SrTiO_3$ substrate 1 generated different refractive indexes in a portion directly below the electrode and other portions. FIG. 6 shows a relationship between voltages providing deflection angles from displacements of laser spot positions on the projection face and the deflection angles. Since a voltage distribution to the thin-film optical waveguide exhibits voltages dependence because of the difference between the dielectric characteristics of the buffer layer and the thin-film optical waveguide, the deflection characteristics also exhibited voltage dependence below about 5 V, while it exhibited first-order electro-optic effect in accordance with the above expression (4) above about 5 V, and at about 20 V a deflection angle was about 50 mrad (2.9 degrees) and an effective electro-optic coefficient was approximately 60 pm/V. A response speed of approximately 10 MHz was obtained. Furthermore, by applying a voltage between the electrode 10 for controlling an emitted light beam provided between the emission prism and the optical waveguide and the electrode formed by the lower Nb-doped $SrTiO_3$ substrate 1, the refractive index of the optical waveguide 3 directly below the emission prism 9 changed and an emission angle from the emission prism 9 changed due to the refractive index change. Since a voltage distribution to the thin-film optical waveguide exhibits voltages dependence because of the difference between the dielectric characteristics of the buffer layer and the thin-film optical waveguide, the deflection characteristics also exhibited voltage dependence below about 10 V, while it exhibited first-order electro-optic effect in accordance with the above expression (7) above about 10 V, and at about 20 V a deflection angle was about 6 mrad (0.3 degrees) and an effective electro-optic coefficient was approximately 60 pm/V. A relationship between voltages and deflection angles is shown in FIG. 7. A response speed of approximately 0.5 MHz was obtained. In this way, the emitted light beam was two-dimensionally deflected as shown in FIG. 1 according to voltages. As has been described above, it has been confirmed that high-speed two-dimensional deflection can be made at voltages two orders of magnitude lower than the prior art, and it has been found that application to laser printer, digital copier, facsimile, display, optical interconnection, optical crossconnect, bar-code reader, glyph code reader, optical disk pickup, optical scanner for surface inspection, optical scanner for surfaceinspection, and the like is possible.

EXAMPLE 2

In this example, in the same way as the example 1, a two-dimensional deflection element as shown in FIG. 1 was fabricated by growing an epitaxial PZT(85/15) buffer layer having a film thickness of about 400 nm on an opaque but low-resistance Nb-doped $SrTiO_3$(100) single-crystal lower electrode substrate, next growing an epitaxial PZT(52/48) thin-film optical waveguide having a film thickness of about 1000 nm, further forming a triangular ITO electrode for controlling a light beam within the optical waveguide and an ITO electrode for controlling an emitted light beam, and providing an incidence end face and an emission prism.

The buffer layer and the optical waveguide were fabricated in the same way as the example 1 by solid phase epitaxial growth. First, PZT(85/5) precursor solution was spin-coated on an Nb-doped $SrTiO_3$ substrate 10 mm square, heated at about 10° C./sec in an $O_2$ atmosphere and preserved at about 350° C., then heated at about 80° C./sec and preserved at about 750° C., and finally the electric furnace was powered off and the solution was cooled. Thereby, a PZT thin film of a first layer having a film thickness of about 100 nm was formed by solid phase epitaxial growth. By repeating this process three more times, an epitaxial PZT buffer layer having a total film thickness of about 400 nm was obtained. Next, PZT(52/48) precursor solution was spin-coated on an Nb-doped $SrTiO_3$ substrate having the buffer layer, heated at about 10° C./sec in an $O_2$ atmosphere and preserved at about 350° C., then heated at about 10° C./sec and preserved at about 650° C., and finally the electric furnace was powered off and the solution was cooled. Thereby, a PZT thin film of a first layer having a film thickness of about 100 nm was formed by solid phase epitaxial growth. By repeating this process nine more times, an epitaxial PZT thin-film optical waveguide having a total film thickness of about 1000 nm was obtained. Crystallographically, a structure of single orientation PZT $(100)//PZT(001)//Nb-SrTiO_3(001)$ with in-plane orientational $PZT[001]//PZT[001]//Nb-SrTiO_3[001]$ was obtained. A triangular electrode 5 for controlling a light beam within the optical waveguide and an electrode 10 for controlling an emitted light beam were formed on the PZT thin-film optical waveguide by the lift off method wherein the electrode 5 was constructed from an ITO thin film having a film thickness of about 200 nm, produced by sputtering, and had a base of 100 $\mu$m and a height of 1000 $\mu$m, and the electrode 10 had an area 1000 $\mu$m square. Furthermore, a light beam incidence part was formed by polishing the end face, a rutile prism 9 having a base angle of 45 degrees and a base of 5 mm was secured on top of the electrode 10 for controlling an emitted light beam, and thus the two-dimensional deflection element was fabricated.

First, to evaluate the optical waveguide characteristics, a laser beam of 633 nm wavelength was introduced to the PLZT thin-film optical waveguide of this example by prism coupling and an intensity distribution of scattered light of $TE_0$ mode in a light propagation direction was measured by an optical fiber. From the gradient of the relationship between the logarithm of scattered light intensity and light propagation distances, light propagation loss was determined to be approximately 3.1 dB/cm, which indicates a practical level. The refractive index n of the PLZT thin-film optical waveguide was approximately 2.56. On the other hand, only the PZT buffer layer of this example was directly formed on the Nb-doped $SrTiO_3$ substrate and the relative dielectric constant of the buffer layer having a film thickness of 400 nm was measured as approximately 400. On the other hand, the relative dielectric constant of the PZT thin-film optical waveguide grown on the Nb-doped $SrTiO_3$ substrate was measured as approximately 600. Accordingly, the effective voltage of the PZT thin-film optical waveguide, calculated from the above expression (1), was approximately 63%.

Figure 8:
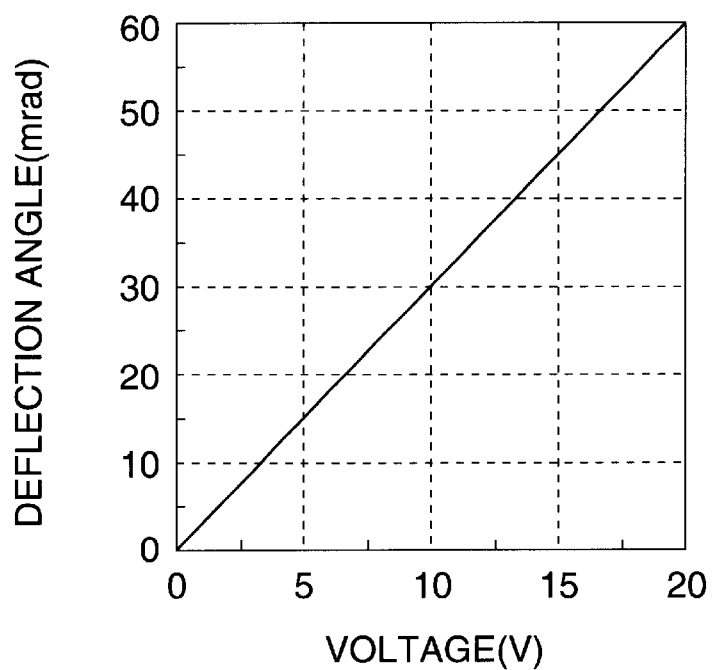
FIG. 8 is a graph showing the characteristics of deflection of light beams by a triangular electrode of the two-dimensional deflection element of an example 2.
Figure 9:
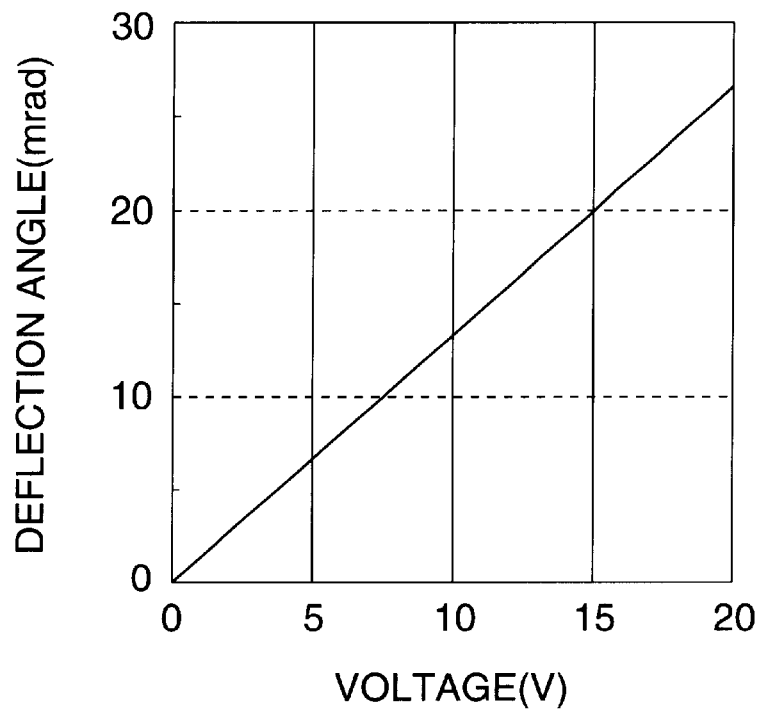
FIG. 9 is a graph showing the characteristics of deflection by an electrode provided between the emission prism and the optical waveguide of the two-dimensional deflection element of the example 2.

A laser beam 6 having a wavelength of 633 nm, collimated about 100 $\mu$m wide through the incidence end face, was introduced to the PZT thin-film optical waveguide 3 of the two-dimensional deflection element of this example. The incident light beam was deflected because a voltage applied between the triangular electrode 5 for controlling a light beam within the optical waveguide and the electrode formed by the lower Nb-doped $SrTiO_3$ substrate 1 generated different refractive indexes in a portion directly below the electrode and other portions. A relation ship between voltages providing deflection angles from displacements of laser spot positions on the projection face and the deflection angles, as shown in FIG. 8, exhibited first-order electro-optic effect in accordance with the above expression (4), and at 20 V a deflection angle was about 60 mrad (3.4 degrees) and an effective electro-optic coefficient was approximately 50 pm/V. A response speed of approximately 10 MHz was obtained, and a deflection of about 300 mrad (17.2 degrees) was obtained when 100 V was applied. Furthermore, by applying a voltage between the electrode 10 for controlling an emitted light beam provided between the emission prism 9 and the optical waveguide and the electrode formed by the lower Nb-doped $SrTiO_3$ substrate 1, the refractive index of the optical waveguide 3 directly below the emission prism 9 changed and an emission angle from the emission prism 9 changed according to the above expression (7) due to the refractive index change. In this example, a deflection angle at 20 V was about 27 mrad (1.5 degrees) as shown in FIG. 9. A response speed of approximately 0.5 MHz was obtained, and when 100 V more was applied, a deflection of about 135 mrad (7.7 degrees) was obtained. In this way, the emitted light beam was two-dimensionally deflected as shown in FIG. 1 according to voltages. As has been described above, it has been confirmed in this example that high-speed two-dimensional deflection can be made at voltages two orders of magnitude lower than the prior art.

COMPARATIVE EXAMPLE 1

In this comparative example, an insulative substrate was substituted for a conductive or semi-conductive substrate. The same two-dimensional deflection element as shown in FIG. 1 was fabricated by growing an epitaxial PZT(52/48) thin-film optical waveguide having a film thickness of about 1000 nm on an insulative $SrTiO_3(100)$ single-crystal substrate having a thickness of 500 $\mu$m, further forming a triangular ITO electrode for controlling a light beam within the optical waveguide and an ITO electrode for controlling an emitted light beam, and providing an incidence end face and an emission prism.

The optical waveguide was fabricated in the same way as the example 1 by solid phase epitaxial growth. Crystallographically, a structure of single orientation PZT $(100)//SrTiO_3(100)$ with in-plane orientation $PZT[001]//SrTiO_3[001]$ was obtained. A triangular electrode 5 for controlling a light beam within the optical waveguide and an electrode 10 for controlling an emitted light beam were formed on the PZT thin-film optical waveguide by the lift off method wherein the electrode 5 was constructed from an ITO thin film having a film thickness of about 200 nm, produced by sputtering, and had a base of 100 $\mu$m and a height of 1000 $\mu$m, and the electrode 10 had an area 1000 $\mu$m square. An In electrode was deposited on the back of the $SrTiO_3$ substrate. Furthermore, a light beam incidence part was formed by polishing the end face, a rutile prism 9 having a base angle of 45 degrees and a base of 5 mm was secured on top of the electrode 10 for controlling an emitted light beam, and thus the two-dimensional deflection element was fabricated.

In this comparative example, the relative dielectric constant of the $SrTiO_3$ substrate was about 250 and the relative dielectric constant of the PZT thin-film optical waveguide was about 600. Since the thickness of the $SrTiO_3(100)$ single-crystal substrate is 500 $\mu$m and the film thickness of the PZT(52/48) thin-film optical waveguide is about 1000 nm, the effective voltage of the PZT thin-film optical waveguide, calculated from the above expression (1), was no more than about 0.1%. A laser beam having a wavelength of 633 nm, collimated about 100 μm wide through the incidence end face, was introduced to the PZT thin-film optical waveguide 3 of the two-dimensional deflection element of this comparative example. The incident light beam was deflected by no more than about 0.1 mrad at 20 V when a voltage was applied between the triangular electrode 5 for controlling a light beam within the optical waveguide and the In electrode on the back of the $SrTiO_3$ substrate. When a voltage was applied between the electrode 9 for controlling an emitted light beam provided between the emission prism and the optical waveguide, and the In electrode on the back of the $SrTiO_3$ substrate, a change of emission angles was no more than about 0.1 mrad or less at 20 V.

COMPARATIVE EXAMPLE 2

In this comparative example, grating was substituted for the emission prism. In the same way as the example 1, a two-dimensional deflection element was fabricated by growing an epitaxial PZT(85/15) buffer layer having a film thickness of about 400 nm on an opaque but low-resistance Nb-doped $SrTiO_3$(100) single-crystal lower electrode substrate, next growing an epitaxial PZT(85/15) thin-film optical waveguide, and further forming an epitaxial PLZT (52/48) thin-film optical waveguide having a film thickness of about 1000 nm, and further forming a triangular ITO electrode for controlling a light beam within the optical waveguide, an incidence end face, an emission grating, and an ITO electrode for controlling a light beam on top of it.

The buffer layer and the optical waveguide were fabricated in the same way as the example 1 by solid phase epitaxial growth. Crystallographically, a structure of single orientation PZT(100)//PZT(100)//Nb-$SrTiO_3$(100)with in-plane orientation PZT[001]//PZT[001]//Nb-$SrTiO_3$[100] was obtained. An emission grating having a cycle of about 2 μm was provided on the PZT thin-film optical waveguide. A triangular electrode for controlling a light beam within the optical waveguide and an electrode for controlling an emitted light beam, 1000 μm square, were formed by the lift off method on the PZT thin-film optical waveguide and the emission grating, respectively wherein the triangular electrode was constructed from an ITO thin film having a film thickness of about 200 nm, produced by sputtering, and had a base of 100 μm and a height of 1000 μm. Furthermore, a light beam incidence part was formed by polishing the end face.

A laser beam 6 having a wavelength of 633 nm, collimated 100 μm wide through the incidence end face, was introduced to the PZT thin-film optical waveguide 3 of the two-dimensional deflection element of this comparative example. The incident light beam was deflected by applying a voltage between the triangular electrode 5 for controlling a light beam within the optical waveguide and the lower Nb-doped $SrTiO_3$ substrate electrode. Furthermore, by applying a voltage between the electrode for controlling an emitted light beam provided on the emission grating and the lower Nb-doped $SrTiO_3$ substrate electrode, the refractive index of the emission grating part changed and an emission angle changed due to the refractive index change. However, since an emitted laser is split into plural beams, the intensity of first-order beams is weak and the emission angle change was about 6 mrad at 20 V, which was smaller than that of the example 2.

Figure 10:
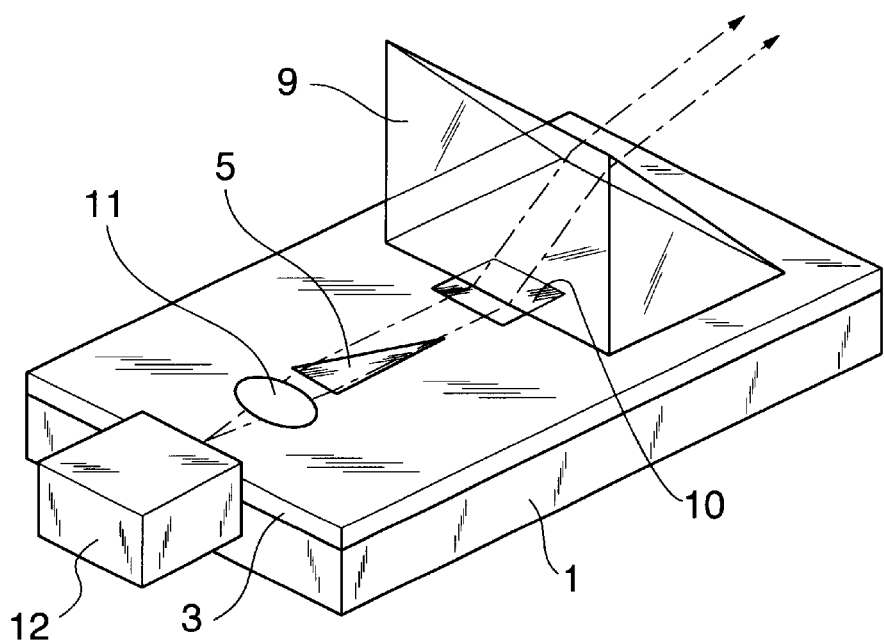
FIG. 10 is a perspective view of the optical deflection element of a second embodiment of the present invention.

Next, a second embodiment of the present invention will be described. In an optical deflection element of this embodiment, as shown in FIG. 10, a collimate lens 11 constructed from a thin-film lens is formed at the laser beam incidence side of the right-triangle upper electrode 5 and a semiconductor laser diode 12 is optically coupled to the end face of the thin-film optical waveguide 3. A description of other constructions, which are the same as those of the first embodiment, is omitted.

According to this embodiment, a laser beam incident to the thin-film optical waveguide 3 through the semiconductor laser diode 12 is collimated by the collimate lens 11, passes through the prism area formed between the electrodes, the transparent electrode, and the emission prism, and can be two-dimensionally deflected as in the first embodiment.

Next, an example of fabricating the optical deflection element of the first embodiment will be described.

EXAMPLE 3

In this example, in the same way as the example 1, a two-dimensional deflection element as shown in FIG. 10 was fabricated by growing an epitaxial PZT(95/5) buffer layer having a film thickness of about 400 nm on an opaque but low-resistance Nb-doped $SrTiO_3$(100) single-crystal lower electrode substrate, forming a lenticular epitaxial PZT(30/70) thin film, as a collimate lens 11, which serves as a mode index lens, growing an epitaxial PLZT(9/65/35) thin-film optical waveguide having a film thickness of about 1000 nm, further forming a triangular ITO electrode for controlling a light beam within the optical waveguide and an ITO electrode for controlling an emitted light beam, and providing a semiconductor laser diode, an incidence end face, and an emission prism.

The buffer layer, the lens layer, and the thin-film optical waveguide were fabricated in the same way as the example 1 by solid phase epitaxial growth. First, PZT(95/5) precursor solution was spin-coated on an Nb-doped $SrTiO_3$ substrate 10 mm square, heated at about 10° C./sec in an $O_2$ atmosphere and preserved at about 350° C., then heated at about 100° C./sec and preserved at about 750° C., and finally the electric furnace was powered off and the solution was cooled. Thereby, a PZT thin film of a first layer having a film thickness of about 100 nm was formed by solid phase epitaxial growth. By repeating this process three more times, an epitaxial PZT buffer layer having a total film thickness of about 400 nm was obtained. After the buffer layer was grown, PZT(30/70) precursor solution was spin-coated, heated in an $O_2$ atmosphere and preserved at about 350° C., and then the electric furnace was powered off and the solution was cooled. By repeating this process seven more times, an amorphous PZT(30/70) thin film was obtained. Next, a negative electron beam resist was spin-coated and prebaked, and then exposed to electron beams into a pupillary lens shape having an opening diameter of about 400 μm. By performing postbaking, then development, a resist pattern of a pupillary lens shape was formed. Furthermore, after hard baking, by etching an amorphous PZT(30/70) thin film by HCl aqueous solution, an amorphous PZT(30/70) thin film of pupillary lens shape was formed. After removing the resist by a remover, the thin film was heated in an $O_2$ atmosphere and preserved at about 350° C., then at about 650° C. to make solid phase epitaxial growth so that an epitaxial PZT(30/70) lens layer having a film thickness of about 800 nm was formed as the collimate lens 11. Next, PLZT(9/65/35) precursor solution was spin-coated, heated at about 10° C./sec in an $O_2$ atmosphere and preserved at about 350° C., then heated at about 100° C./sec and preserved at about 750° C., and finally the electric furnace was powered off and the solution was cooled. Thereby, a PLZT thin film of a first layer having a film thickness of about 100 nm was formed by solid phase epitaxial growth. By repeating this process nine more times, an epitaxial PLZT thin-film optical waveguide having a total film thickness of about 1000 nm was obtained on the buffer layer having the lens layer. Crystallographically, a structure of single orientation PLZT(100) thin-film optical waveguide//PZT(100) lens layer//PZT(100) buffer layer//Nb-SrTiO$_3$(100) substrate with in-plane orientation PLZT[001] thin-film optical waveguide//PZT[001] lens layer//PZT[001] buffer layer//Nb-SrTiO$_3$[001] substrate was obtained. A triangular electrode 5 for controlling a light beam within the optical waveguide and an electrode 10 for controlling an emitted light beam were formed on the PLZT thin-film optical waveguide by the lift off method wherein the electrode 5 was constructed from an ITO thin film having a film thickness of about 200 nm, produced by sputtering, and had a base of 200 μm and a height of 2000 μm, and the electrode 10 had an area 1000 μm square. Furthermore, after a light beam incidence part was formed by polishing the end face, the semiconductor laser 12 was disposed. A rutile prism 9 having a base angle of 60 degrees and a base of 2 mm was secured on top of the electrode 10 for controlling an emitted light beam, and thus the two-dimensional deflection element was fabricated.

In the two-dimensional deflection element of this example, a laser beam incident to the PLZT thin-film optical waveguide 3 from the semiconductor laser 12 attached to the incidence face was collimated 200 μm wide by the collimate lens 11 constructed from a thin-film lens. The collimated laser beam is deflected by applying a voltage between the triangular electrode 5 for controlling a light beam within the optical waveguide and the lower Nb-doped SrTiO$_3$ substrate electrode. Furthermore, an emission angle from the emission prism 9 is changed by applying a voltage between the electrode 9 for an emitted light beam disposed between the emission prism and the optical waveguide, and the lower Nb-doped SrTiO$_3$ substrate electrode. In this way, a two-dimensional deflection element provided with a semiconductor laser can be fabricated by providing a thin-film lens.

Figure 11:
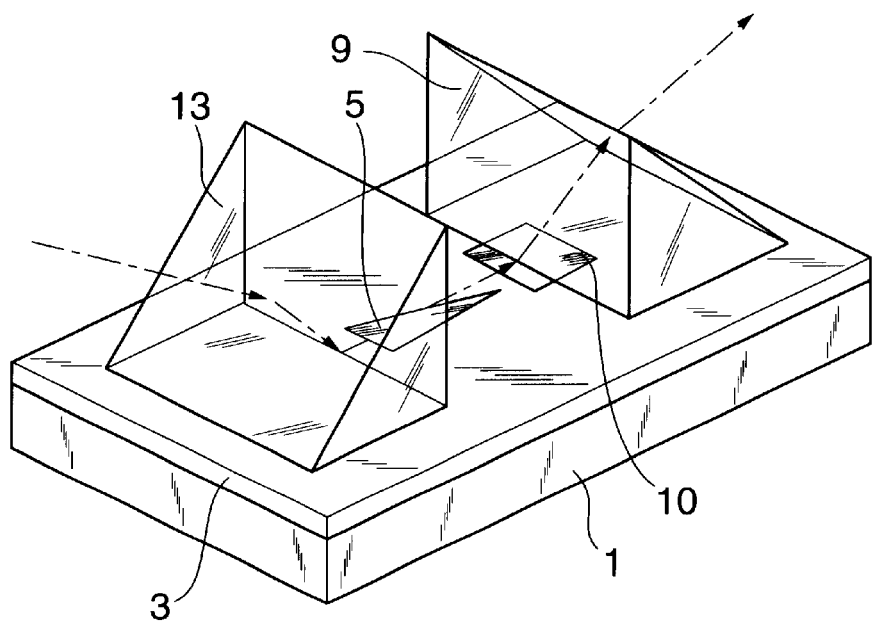
FIG. 11 is a perspective view of the optical deflection element of a third embodiment of the present invention.

Next, a third embodiment of the present invention will be described. In the optical deflection element of this example, as shown in FIG. 11, a prism 13 is provided at the laser beam incidence face of the triangular upper electrode 5 so that the oblique face is an incidence face, which is opposite in direction to the prism 9. A description of other constructions, which are the same as those of the first embodiment, is omitted.

According to this embodiment, a laser beam incident to the thin-film optical waveguide 3 through the oblique face of the prism 13 passes through the prism area formed between the electrodes and can be two-dimensionally deflected as in the first embodiment. In this embodiment, thick laser beams can be made efficiently incident because the oblique face of the prism to which the laser beams are incident is broad.

Next, an example of fabricating the optical deflection element of the third embodiment will be described.

EXAMPLE 4

A two-dimensional deflection element as shown in FIG. 11 was constructed by growing an epitaxial PZT(52/48) thin-film optical waveguide having a film thickness of about 1000 nm on an Nb-doped SrTiO$_3$(100) single-crystal lower electrode substrate provided with transparence and conductivity wherein the SrTiO$_3$(100) single crystal was not so much Nb-doped as that of the example 2, further forming a triangular Al-doped ZnO electrode for controlling a light beam within the optical waveguide and an Al-doped ZnO electrode for controlling an emitted light beam, and providing incidence and emission prisms.

A PZT(52/48) thin-film optical waveguide can make epitaxial growth by Rf magnetron sputtering. Crystallographically, a structure of single orientation PZT (100) thin-film optical waveguide//Nb-SrTiO$_3$(100) substrate is obtained. A triangular electrode 5 for controlling a light beam within the optical waveguide and an electrode 10 for controlling an emitted light beam can be formed on the PZT thin-film optical waveguide by the lift off method wherein the electrode 5 is constructed from an Al-doped ZnO thin film having a film thickness of about 200 nm, produced by sputtering, and has a base of 100 μm and a height of 2000 μm, and the electrode 10 had an area 1000 μm square. A light beam incidence part was formed by securing a rutile prism 13 having a base angle of 60 degrees and a base of 2 mm, a rutile prism 9 having a base angle of 80 degrees and a base of 2 mm was secured on top of the electrode 10 for controlling an emitted light beam, and thus the two-dimensional deflection element was fabricated.

In the two-dimensional deflection element of this example, a collimated laser beam incident to the PLZT thin-film optical waveguide 3 through the incidence rutile prism 13 is deflected by applying a voltage between the triangular electrode 5 for controlling a light beam within the optical waveguide and the lower Nb-doped SrTiO$_3$ substrate electrode. Furthermore, an emission angle from the emission prism 9 is changed by applying a voltage between the electrode 10 for an emitted light beam disposed between the emission prism and the optical waveguide, and the lower Nb-doped SrTiO$_3$ substrate electrode. In this way, a two-dimensional deflection element can be constructed.

Figure 12:
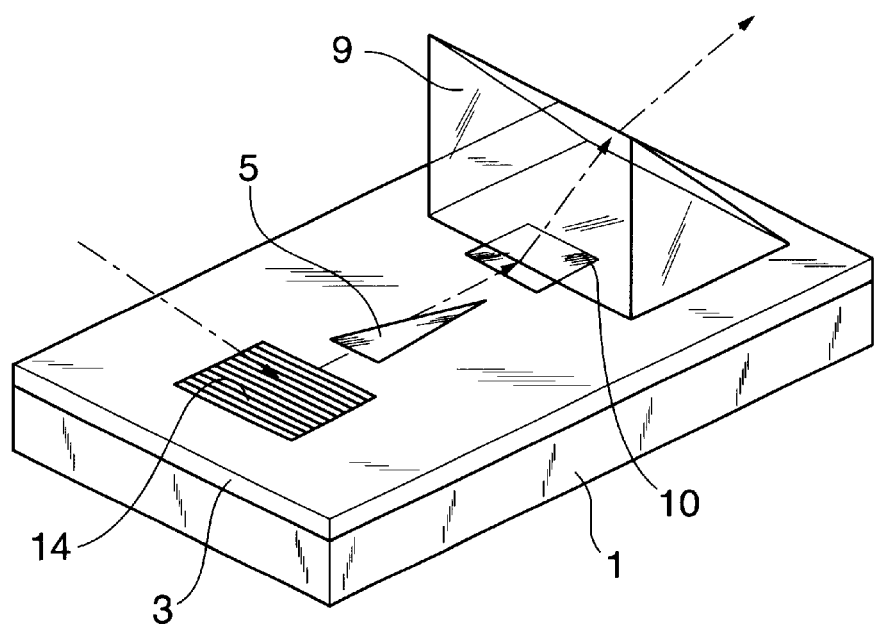
FIG. 12 is a perspective view of the optical deflection element of a fourth embodiment of the present invention.

Next, a fourth embodiment of the present invention will be described. In the optical waveguide deflection element, as shown in FIG. 12, an incidence grating 14 is provided at the laser beam incidence side of the right-triangle upper electrode 5. A description of other constructions, which are the same as those of the first embodiment, is omitted.

According to this embodiment, a collimated laser beam incident through the incidence grating 14 passes through the prism area formed between the electrodes and can be two-dimensionally deflected as in the first embodiment. In this embodiment, thick laser beams can be made efficiently incident because the grating face to which the laser beams are incident is broad.

Next, an example of fabricating the optical deflection element of the fourth embodiment will be described.

EXAMPLE 5

As an example 5, a two-dimensional deflection element as shown in FIG. 12 was constructed by forming an Al-doped ZnO conductive thin film having a film thickness of about 200 nm, which servers as a lower electrode, on an Al$_2$O$_3$ (0001) single-crystal substrate by epitaxial growth, next growing an epitaxial LiNbO$_3$ thin-film optical waveguide having a film thickness of about 600 nm, further forming a triangular Al-doped ZnO electrode for controlling a light beam within the optical waveguide and an Al-doped ZnO electrode for controlling an emitted light beam, and providing an incidence grating and an emission prism.

The Al-doped ZnO thin film can make epitaxial growth by Rf magnetron sputtering and, next, the LiNbO$_3$ thin-film optical waveguide can make epitaxial growth in situ by Rf magnetron sputtering. Crystallographically, a structure of single orientation LiNbO$_3$(0001) thin-film optical waveguide//Al-ZnO(001) conductive thin film//Al$_2$O$_3$ (0001) substrate is obtained. After a domain inversion area of prism shape having a base of 100 μm and a height of 1000 μm is formed on the LiNbO$_3$ thin-film optical waveguide, on top of it is formed, by etching, a triangular electrode 5 for controlling a light beam within the optical waveguide wherein the electrode 5 is constructed from an Al-doped ZnO thin film having a film thickness of about 200 nm, produced by sputtering, and has a base of 100 μm and a height of 1000 μm. Similarly, an electrode 10 for controlling an emitted light beam, 2000 μm square, is formed by etching. Furthermore, a grating 14 for light beam incidence is formed by patterning TiO$_2$, a rutile prism 9 having a base angle of 60 degrees and a base of 3 mm is secured on top of the electrode 10 for controlling an emitted light beam, and thus the two-dimensional deflection element is fabricated.

In the two-dimensional deflection element of this example, a collimated laser beam incident to the LiNbO$_3$ thin-film optical waveguide 3 through the incidence grating 14 is deflected by applying a voltage between the triangular electrode 5 for controlling a light beam within the optical waveguide and the lower conductive Al-doped ZnO thin-film electrode. Furthermore, an emission angle from the emission prism 9 is changed by applying a voltage between the electrode 10 for an emitted light beam disposed between the emission prism and the optical waveguide, and the lower conductive Al-doped ZnO thin-film electrode. In this way, a two-dimensional deflection element can be constructed.

Figure 13:
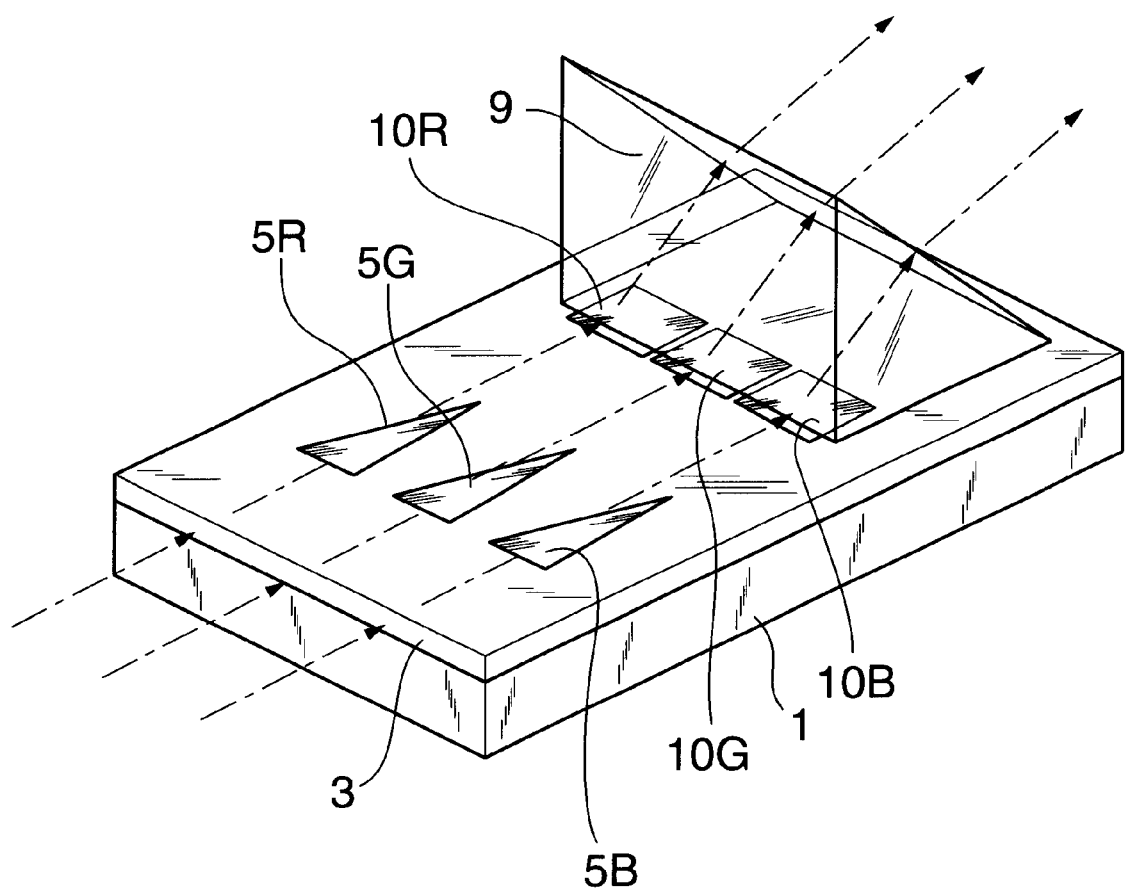
FIG. 13 is a perspective view of the optical deflection element of a fifth embodiment of the present invention.

Next, a fifth embodiment of the present invention will be described. In an optical deflection element of this embodiment, as shown in FIG. 13, right-triangle upper electrodes 5R, 5G, and 5B are provided, and in the laser beam propagation sides of the upper electrodes 5R, 5G, and 5B are provided rectangular upper transparent electrodes 10R, 10G, and 10B, respectively. The upper electrodes 5R, 5G, and 5B, and the upper transparent electrodes 10R, 10G, and 10B are the same as the upper electrode 5 and the upper transparent electrode 10. Each of the upper electrodes 5R, 5G, and 5B, and each of the upper electrodes 10R, 10G, and 10B is powered independently so that applied voltages are controllable. The emission prism 9 is provided on the upper transparent electrodes so that a part of each of the upper transparent electrode 10R, 10G, and 10B is exposed. A description of other constructions, which are the same as those of the first embodiment, is omitted. Although, in the example of this embodiment, three upper electrodes and three upper transparent electrodes were provided to two-dimensionally deflect laser beams of three colors, red, green, and blue, the number of the upper electrodes and the upper transparent electrodes can be set in accordance with the number of laser beams to be two-dimensionally deflected.

According to this embodiment, light beams of three wavelengths can be two-dimensionally deflected, application to a color display becomes possible.

In the above-described second to fourth embodiments, if the right-triangle upper electrodes 5 and the upper transparent electrodes 10 are provided three each, application to a color display to two-dimensionally deflect light beams of three wavelengths becomes possible.

Next, an example of fabricating the optical deflection element of the fifth embodiment will be described.

EXAMPLE 6

As an example 6, a two-dimensional deflection element for three light beams different in wavelength, as shown in FIG. 13, was constructed by forming an SrRuO$_3$ conductive thin film having a film thickness of about 200 nm, which servers as a lower electrode, on an SrTiO$_3$(100) single-crystal substrate by epitaxial growth, next growing an epitaxial PZT(85/15) buffer layer having a film thickness of about 1600 nm, then growing an epitaxial PZT (52/48) thin-film optical waveguide having a film thickness of about 1000 nm, further forming a triangular ITO electrode for controlling a light beam within the optical waveguide and an ITO electrode for controlling an emitted light beam, and providing an incidence end face and an emission prism.

The SrRuO$_3$ conductive thin film of this embodiment can make epitaxial growth by sputtering. The buffer layer and the optical waveguide can be fabricated by solid phase epitaxial growth in the same way as in the example 1. Crystallographically, a structure of single orientation PZT (100)//PZT(100)//SrRuO$_3$(100)//SrTiO$_3$(100) was obtained. Triangular electrodes 5R, 5G, and 5B for controlling a light beam within the optical waveguide and electrodes 10R, 10G, and 10B for controlling an emitted light beam were formed at an interval of about 1000 μm on the PZT thin-film optical waveguide by the lift off method wherein the electrodes 5R, 5G, and 5B each were constructed from an ITO thin film having a film thickness of about 200 nm, produced by sputtering, and had a base of 200 μm and a height of 2000 μm, and the electrodes 10R, 10G, and 10B each had an area 1000 μm square. Furthermore, a light beam incidence part was formed by polishing the end face, a rutile prism 9 having a base angle of 50 degrees and a base of 5 mm was secured on top of the electrodes 10R, 10G, and 10B for controlling an emitted light beam, and thus the two-dimensional deflection element was fabricated.

Laser beams of three wavelengths 647, 515, and 488 nm corresponding to RGB colors, collimated about 200 μm wide to the PZT thin-film optical waveguide 3 of the two-dimensional deflection element of this embodiment through the incidence end face, were introduced to each of the prism areas directly below the three triangular electrodes. Each of the incident laser beams was deflected by independently applying a voltage between each of the triangular electrodes for controlling a light beam within the optical waveguide and the lower Nb-doped SrTiO$_3$ substrate electrode. Furthermore, the emission angle of each laser beam from the emission prism 9 was changed by independently applying a voltage between the electrodes for controlling an emitted light beam provided between the emission prism and the optical waveguide and the lower Nb-doped SrTiO$_3$ substrate electrode. Light beams of three wavelengths thus emitted were independently deflected according to a voltage. As has been described above, since light beams of three wavelengths can be two-dimensionally deflected, application to a color display is possible.

Figure 14:
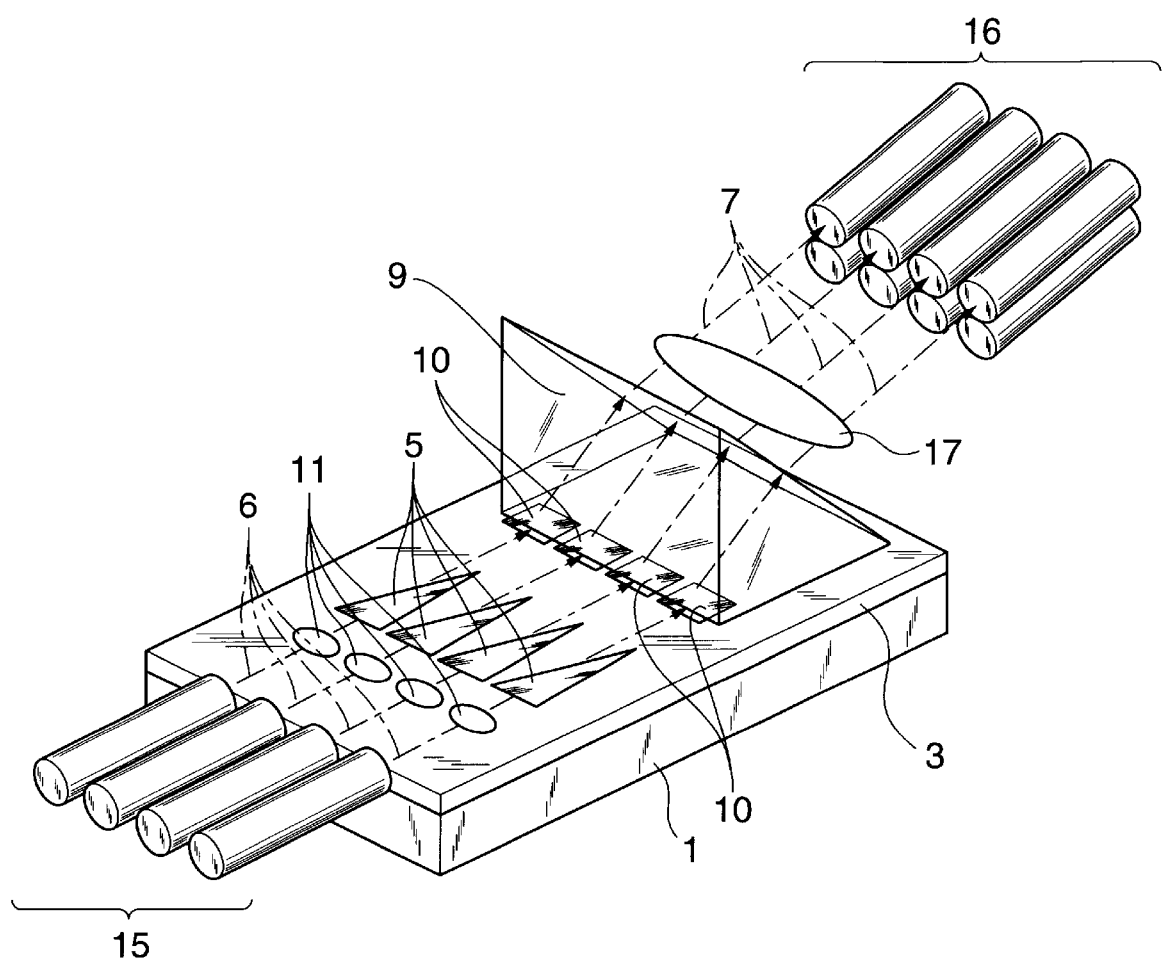
FIG. 14 is a perspective view of the optical deflection element of a sixth embodiment of the present invention.

Next, a sixth embodiment of the present invention will be described. In an optical deflection element of the present invention, as shown in FIG. 14, thin-film lenses 11, triangular upper electrodes 5, and electrodes for an emitted light beam are provided corresponding to laser beams 6 incident through the end face of the thin-film optical waveguide 3 from plural optical fibers. The laser beams emitted from the prism 9 are emitted to plural optical fibers. A description of other constructions, which are the same as those of the first embodiment, is omitted.

According to this embodiment, since laser beams incident from plural optical fibers can be emitted and controlled in two-dimensional directions and made selectively incident to plural optical fibers, optical crossconnect can be made among plural fibers.

Next, an example of fabricating the optical deflection element of the sixth embodiment will be described.

EXAMPLE 7

In this example, in the same way as the example 1, on an opaque but low-resistance Nb-doped $SrTiO_3(100)$ single-crystal lower electrode substrate, an epitaxial PLZT(9/65/35) buffer layer having a film thickness of about 1400 nm was grown, four lenticular epitaxial PZT(30/70) thin films 11 each having a film thickness of about 2000 nm, as a collimate lens 11, which serves as a mode index lens, were formed, and further an epitaxial PZT(52/48) thin-film optical waveguide having a film thickness of about 2200 nm was grown. Four prismatic triangular electrodes 5 for controlling a light beam within the optical waveguide and four electrodes 10 for controlling an emitted light beam, 500 $\mu$m square, were formed by the lift off method on the PZT thin-film optical waveguide wherein the prismatic electrodes each was constructed from an ITO thin film having a film thickness of about 200 nm, produced by sputtering, and had a base of 500 $\mu$m and a height of 5000 $\mu$m. Furthermore, after a light beam incidence part was formed by polishing the end face, a rutile prism 9 with a wide angle of 45 degrees and a base of 5 mm was formed on top of the electrodes 10 for controlling an emitted light beam to which an array 15 of four optical fibers with a pitch of 250 $\mu$m was attached, and thus a two-dimensional deflection element was fabricated. A lens 17 was provided so that light beams emitted from the rutile prism converged to an array 16 of optical fibers arranged four by two with a pitch of 250 $\mu$m, and thus a two-dimensional deflection element as shown in FIG. 14 was constructed.

Laser beams 6 incident from the optical fiber array 16 attached to the end face of the PZT thin-film optical waveguide 3 of the two-dimensional deflection element of this example were respectively introduced to the four prism electrodes. Each of the laser beams was deflected by applying a voltage from 0 to 20 between the prismatic electrode 5 for controlling a light beam within the optical waveguide and the lower Nb-doped $SrTiO_3$ substrate electrode 1. Furthermore, an emission angle of each laser beam from the emission prism 9 was changed by applying a voltage from 0 to 20 V between the electrode 9 for an emitted light beam disposed between the emission prism and the optical waveguide, and the lower Nb-doped $SrTiO_3$ substrate electrode 1. Four laser beams 7 thus emitted were deflected according to a voltage and could be coupled to the emitted optical fiber array 16 after being converged by the lens 17. In this way, switching among four-by-eight optical fibers has been made possible by only one deflection element.

As has been described above, since a single substrate is used to construct an optical waveguide element, the present invention has the effect of providing a small-size optical waveguide element that requires no optical axis adjustments, can be driven at a low voltage, is excellent in light utilization efficiency, and can rapidly two-dimensionally deflect a light beam. The optical deflection element of the present invention is applicable to the entire spectrum of optoelectronics including laser printer, digital copier, facsimile, display, optical interconnection, optical crossconnect, bar-code reader, glyph code reader, optical disk pickup, optical scanner for surface inspection, optical scanner for surface shape presumption, and the like.

What is claimed is:

1. An optical deflection element, comprising:
    an optical waveguide having epitaxial or single orientation with electro-optic effect, provided on a conductive or semi-conductive single-crystal substrate to serve as a lower electrode, or a substrate on the surface of which a conductive or semi-conductive single-crystal thin film to serve as a lower electrode is formed;
    an electrode for controlling a light beam within the optical waveguide, disposed on the optical waveguide, the electrode forming an area, between the electrode and the single-crystal substrate or single-crystal thin film, that changes in refractive index in accordance with an applied voltage and deflects a light beam propagating through the optical waveguide in a first direction in accordance with the applied voltage;
    an emission prism for emitting the light beam within the optical waveguide in a second direction crossing the first direction; and
    a transparent electrode for controlling an emitted light beam, disposed between the emission prism and the optical waveguide, the transparent electrode forming an area, between the transparent electrode and the single-crystal substrate or single-crystal thin film, that changes in refractive index in accordance with an applied voltage and deflects a light beam emitted from the emission prism in the second direction in accordance with the applied voltage.

2. The optical deflection element according to claim 1, wherein the electrode for controlling a light beam within the optical waveguide is formed in a triangular shape and has a prism area formed within the optical waveguide, which has a different refractive area from surrounding areas upon application of a voltage.

3. The optical deflection element according to claim 1, wherein the optical waveguide has a polarization domain inversion area of prism shape, and the electrode for controlling a light beam within the optical waveguide, which is formed in a triangular shape, upon application of a voltage, forms within the optical waveguide the polarization domain inversion area of prism shape having a different refractive index from surrounding areas.

4. The optical deflection element according to claim 1, wherein the substrate on which the single-crystal thin film is formed has a smaller refractive index than the optical waveguide and is a substrate on the surface of which an epitaxial or single orientation conductive or semi-conductive oxide is provided as a thin film.

5. The optical deflection element according to claim 1, wherein the optical waveguide is provided on the single-crystal substrate or single-crystal thin film through a buffer layer having a smaller refractive index than the optical waveguide.

6. The optical deflection element according to claim 1, wherein the conductive or semi-conductive single-crystal substrate is formed of a transparent oxide having a smaller refractive index than the optical waveguide.

7. The optical deflection element according to claim 1, wherein a clad layer having a smaller refractive index than the optical waveguide is provided on the surface of the optical waveguide.

8. The optical deflection element according to claim 1, wherein the optical waveguide is formed of an oxide ferro-electrics.

9. The optical deflection element according to claim 1, wherein the plurality of electrodes for controlling a light beam within the optical waveguide and the plurality of transparent electrodes for controlling an emitted light beam are disposed.

10. The optical deflection element according to claim 1, wherein plural light beams enter the optical waveguide.

* * * * *